(12) United States Patent
Ono et al.

(10) Patent No.: US 8,040,551 B2
(45) Date of Patent: Oct. 18, 2011

(54) IMAGE ALBUM CREATING SYSTEM, IMAGE ALBUM CREATING METHOD AND IMAGE ALBUM CREATING PROGRAM

(75) Inventors: Shuji Ono, Kanagawa (JP); Hiroyuki Funakura, Kanagawa (JP); Tetsuya Sawano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1089 days.

(21) Appl. No.: 11/519,766

(22) Filed: Sep. 13, 2006

(65) Prior Publication Data
US 2007/0070408 A1    Mar. 29, 2007

(30) Foreign Application Priority Data

Sep. 26, 2005 (JP) .................................. 2005-277452
Jun. 2, 2006 (JP) .................................. 2006-154584

(51) Int. Cl.
*G06K 15/00* (2006.01)
(52) U.S. Cl. .......... 358/1.18; 358/1.2; 358/2.1; 715/204; 715/206; 715/240; 715/243
(58) Field of Classification Search ................. 358/1.18, 358/527, 537
See application file for complete search history.

(56) References Cited

U.S. PATENT DOCUMENTS

| 6,202,061 | B1 * | 3/2001 | Khosla et al. ........................ 1/1 |
| 6,437,797 | B1 * | 8/2002 | Ota ............................... 345/638 |
| 6,771,801 | B1 * | 8/2004 | Fisher et al. .................. 382/112 |
| 2002/0046242 | A1 * | 4/2002 | Kuroiwa et al. .............. 709/203 |
| 2002/0122067 | A1 * | 9/2002 | Geigel et al. .................. 345/788 |
| 2002/0186402 | A1 * | 12/2002 | Jackson et al. ................ 358/1.15 |
| 2006/0077278 | A1 * | 4/2006 | Parulski et al. .......... 348/333.01 |
| 2007/0070408 | A1 * | 3/2007 | Ono et al. ..................... 358/1.15 |

FOREIGN PATENT DOCUMENTS

| JP | 10-200730 A | 7/1998 |
| JP | 2004/048284 A | 2/2004 |
| JP | 2004-318221 A | 11/2004 |

* cited by examiner

*Primary Examiner* — Benny Tieu
*Assistant Examiner* — Marcellus Augustin
(74) *Attorney, Agent, or Firm* — Sughrue Mion, PLLC

(57) ABSTRACT

There is provided an image album creating system for creating an image album by receiving high image-quality images used for creating the image album after creating an image album sample by using low image-quality images, having a low image-quality image receiving section for receiving the low image-quality images of original images whose image quality has been lowered by an orderer of the image album from an image album orderer's apparatus, an image information receiving section for receiving image information concerning the original image that can be specified from the original image or in capturing the original image and cannot be specified from the low image-quality image by correlating with each one of the low image-quality images received by the low image-quality image receiving section, an image selecting section for selecting the low image-quality image to be allocated to the image album out of the low image-quality images received by the low image-quality image receiving section by analyzing the low image-quality image and the image information and a selected image notifying section for notifying the orderer of the image album of the low image-quality image selected by the image selecting section.

30 Claims, 8 Drawing Sheets

FIG. 4

| LAYOUT FRAME | TYPE OF IMAGE | | | | IMAGE PROCESSING METHOD |
|---|---|---|---|---|---|
| | INDEX 1 | INDEX 2 | INDEX 3 | ... | |
| ... | ... | ... | ... | ... | ... |
| LAYOUT FRAME 600 | PRINCIPAL PERSON | SMILE | HIGH IMAGE-QUALITY | ... | NIL |
| LAYOUT FRAME 602 | PET | LOW IMAGE-QUALITY | NUMBER OF PETS | ... | TRIMMING |
| ... | ... | ... | ... | ... | ... |
| LAYOUT FRAME 620 | PERSON | IMAGE CAPTURING PLACE | IMAGE CAPTURING TIME AND DATE | ... | NIL |
| LAYOUT FRAME 630 | NIGHT VIEW MODE | IMAGE CAPTURING PLACE | FRIENDS | ... | TRIMMING |
| LAYOUT FRAME 640 | NO STROBO FLASH | PERSON | FOCUSING DISTANCE | ... | MONOCHROMY |
| ... | ... | ... | ... | ... | ... |

254

IMAGE ALBUM CREATING SYSTEM, IMAGE ALBUM CREATING METHOD AND IMAGE ALBUM CREATING PROGRAM

BACKGROUND OF THE INVENTION

1. Field of the Invention

The present invention relates to an image album creating system, an image album creating method and an image album creating program. More specifically, the invention relates to an image album creating system, an image album creating method and an image album creating program for creating an image album by using images provided from an orderer of the image album.

2. Related Art

Conventionally, there has been proposed a method of causing a user to edit images read at low resolution and recording edit information and then of editing and outputting the images read at high resolution based on the edit information as disclosed in Japanese Patent Laid-Open No. 1998-200730 for example.

There has been also proposed a method of causing a user to make an order to create media by transmitting images and order information via on-line and of transmitting preview of the media at low resolution (sum-nail) as disclosed in Japanese Patent Laid-Open No. 2004-318221 for example.

The server prepares and issues an order sheet when it obtains image information from the user. Then, there has been proposed a method of printing desirable images by specifying images to be fitted into image frames of a template selected through a portable phone while making reference to No. of the images described in the order sheet as disclosed in Japanese Patent Laid-Open No. 2004-48284 for example.

However, because the invention described in Japanese Patent Laid-Open No. 1998-200730 requires the user to edit images, it takes time for the user who is not accustomed to editing images. It may be also hard for the user to edit all images when there is a lot of images. Japanese Patent Laid-Open No. 2004-318221 also requires the user to transmit all images to the server at first, so that it may take a lot of time and may increase communication traffics and communication costs, though it depends on communication speed, to transmit a large number of images to the server in creating an album for example. Japanese Patent Laid-Open No. 2004-48284 also requires the user to input all identification Nos. of images to be printed one by one to the portable phone, so that it also takes a lot of works and time for the user.

Accordingly, it is an object of the invention to provide an image album creating system, an image album creating method and an image album creating program, which are capable of solving the above-mentioned problems. This object may be achieved through the combination of features described in independent claims of the invention. Dependent claims thereof specify preferable embodiments of the invention.

SUMMARY OF THE INVENTION

In order to solve the above problems, according to a first aspect of the invention, there is provided an image album creating system for creating an image album by using images provided from an orderer of the image album, having a low image-quality image receiving section for receiving low image-quality images of original images whose image quality has been lowered from an image album orderer's apparatus, an image information receiving section for receiving image information concerning the original image that can be specified from the original image or in capturing the original image and cannot be specified from the low image-quality image by correlating with each one of the low image-quality images received by the low image-quality image receiving section, an image selecting section for selecting the low image-quality image to be allocated to the image album out of the low image-quality images received by the low image-quality image receiving section by analyzing the low image-quality image and the image information and a selected image notifying section for notifying the orderer of the image album of the low image-quality image selected by the image selecting section.

The image album creating system may include a selected image receiving section for receiving the original images corresponding to the low image-quality images selected by the image selecting section from the image album orderer's apparatus and an image album creating section for creating the image album by allocating the original images received by the selected image receiving section. The image album creating system may further include a sample creating section for creating a sample of the image album by allocating the low image-quality images selected by the image selecting section and a sample transmitting section for transmitting the image album sample created by the sample creating section to the image album orderer's apparatus to show to the orderer of the image album, and the selected image receiving section may receive the original images corresponding to the low image-quality images contained in the image album sample from the image album orderer's apparatus. The sample creating section may create a plurality of different image album samples by allocating the low image-quality images selected by the image selecting section, the sample transmitting section may transmit the plurality of image album samples created by the sample creating section to the image album orderer's apparatus to show to the orderer of the image album so that the orderer selects at least one image album sample out of the plurality of image album samples and the selected image receiving section may receive the original images corresponding to the low image-quality images contained in the image album sample selected by the orderer of the image album from the image album orderer's apparatus.

The image album creating system may further include an image processing method storing section for storing image processing methods for reducing an amount of data of the images allocated to a layout frame where the images are allocated in the image album by correlating with the layout frame and an image processing method extracting section for extracting the image processing method stored in the image processing method storing section per low image-quality image by correlating with the layout frame in which the original image corresponding to the low image-quality image selected by the image selecting section is allocated, and the selected image notifying section may notify the orderer of the image album of the image processing method per low image-quality image obtained by the image processing method extracting section together with the low image-quality image selected by the image selecting section. The image album creating system may further include a selected image receiving section for receiving a processed image that is what image processing specified by the image processing method per low image-quality image extracted by the image processing method extracting section has been performed on the original image from the image album orderer's apparatus and an image album creating section for creating the image album by allocating the processed images received by the selected image receiving section.

The image album creating system may further include a sample creating section for creating an image album sample by allocating processed images of the low image-quality images, selected by the image selecting section, on which image processing specified by an image processing method extracted by the image processing method extracting section per low image-quality image has been performed and a sample transmitting section for transmitting the image album sample created by the sample creating section to the image album orderer's apparatus to show to the orderer of the image album, and the selected image receiving section may receive the processed image of the original image, corresponding to the processed low image-quality image contained in the image album sample, on which image processing specified by the image processing method extracted by the image processing method extracting section per low image-quality image has been performed from the image album orderer's apparatus.

The sample creating section may create a plurality of different image album samples by allocating processed low image-quality images of the low image-quality images, selected by the image selecting section, on which image processing specified by the image processing method extracted by the image processing method extracting section per low image-quality image has been performed, the sample transmitting section may transmit the plurality of image album samples created by the sample creating section to the image album orderer's apparatus to show to the orderer of the image album so that the orderer selects at least one sample out of the plurality of image album samples and the selected image receiving section may receive the processed images corresponding to the processed low image-quality images contained in the image album sample selected by the orderer of the image album from the image album orderer's apparatus.

The low image-quality image receiving section may also receive low-resolution images of the original images whose resolution has been lowered by the image album orderer. Then, the image information receiving section may receive resolution of the original image as image information concerning the original image and the image selecting section may select the low image-quality image to be allocated to the image album based on the resolution of the original image. The image information receiving section may also receive position of an object in the original image as image information concerning the original image and the image selecting section may select the low image-quality image to be allocated to the image album based on the position of the object in the original image. Then, the image information receiving section may receive position and size of a face in the original image as image information concerning the original image and the image selecting section may select the low image-quality image to be allocated to the image album based on the position and size of the face in the original image.

The low image-quality image receiving section may also receive a low image-quality image in which high-frequency components of the original image has been cut by the orderer of the image album. The image information receiving section may receive information indicating adequacy of focusing in capturing the original image and the image selecting section may select the low image-quality image to be allocated to the image album based on the information indicating the adequacy of focusing in capturing the original image. The image information receiving section may also receive frequency level of high-frequency components cut in the original image as image information concerning the original image and the image selecting section may select the low image-quality image to be allocated to the image album by judging adequacy of focusing when the original image was captured based on the frequency level of the high-frequency components cut in the original image.

The image information receiving section may further receive focusing distance when the original image was captured as image information concerning the original image and the image selecting section may select the low image-quality image to be allocated to the image album based on the focusing distance when the original image was captured. Still more, the image information receiving section may receive person identifying information for identifying a person in the original image as image information concerning the original image and the image selecting section may select the low image-quality image to be allocated to the image album based on the person identifying information in the original image. The image information receiving section may also receive personal characteristic information indicating distinctive character of a person in the original image as image information concerning the original image and the image selecting section may select the low image-quality image to be allocated to the image album based on the personal characteristic information in the original image.

Furthermore, the image information receiving section may receive personal expression information indicating expression of a person in the original image as image information concerning the original image and the image selecting section may select the low image-quality image to be allocated to the image album based on the personal expression information in the original image. The image information receiving information may also receive group attribute information indicating an attribute of each one of a plurality of groups into which the plurality of original images has been categorized based a criterion set in advance as image information concerning the original image and the image selecting section may select the low image-quality image to be allocated to the image album based on the group attribute information in the original image. Then, the image information receiving section may receive group attribute information indicating a type of each object in the plurality of groups into which the plurality of original image has been categorized based on the type of objects as image information concerning the original image and the image selecting section may select the low image-quality image to be allocated to the image album based on the group attribute information indicating the type of the object in the original image.

The low image-quality image receiving section may also receive low image-quality images of original images whose image quality has been lowered by each one of a plurality of image album orderers from each one of a plurality of image album orderer's apparatuses, the image information receiving section may receive image information concerning the original image from each one of the plurality of image album orderer's apparatuses by correlating with each one of the low image-quality images received by the low image-quality image receiving section, the image selecting section may select the low image-quality images to be allocated to the image album out of the plurality of low image-quality images received respectively by the low image-quality image receiving section by analyzing each one of the low image-quality images and the image information and the selected image notifying section may notify the plurality of image album orderers of the low image-quality images selected by the image selecting section.

The image album creating system may further include a sample creating section for creating an image album sample by allocating the low image-quality images selected by the image selecting section, a sample transmitting section for transmitting the image album sample created by the sample creating section to the plurality of image album orderer's apparatuses to show to the plurality of image album orderers and a selected image receiving section for receiving the original images corresponding to the low image-quality images contained in the image album sample from each one of the plurality of image album orderer's apparatuses. Then, the sample creating section may create a plurality of different image album samples by allocating the low image-quality images selected by the image selecting section, the sample transmitting section may transmit the plurality of image album samples created by the sample creating section respectively to the plurality of image album orderer's apparatuses to show to the plurality of image album orderers so that the orderers select at least one out of the plurality of image album samples and the selected image receiving section may receive the original images corresponding to the low image-quality images contained in the image album sample selected at least by one of the plurality of image album orderers from each one of the plurality of image album orderer's apparatuses.

According to a second aspect of the invention, there is provided an image album creating system having an image album orderer's apparatus for ordering to make an image album and an image album creating apparatus for creating the image album by using images provided from the image album orderer's apparatus, wherein the image album orderer's apparatus has an image quality converting section for generating a low image-quality image by lowering image quality of an original image, an image information adding section for correlating image information concerning the original image, that can be specified from the original image or when the original image was captured and that cannot be specified from the low image-quality image, with each one of the low image-quality images, a low image-quality image transmitting section for transmitting the low image-quality images generated by the image quality converting section to the image album creating apparatus and an image information transmitting section for transmitting image information correlated by the image information adding section to each one of the low image-quality images to the image album creating apparatus by correlating with each one of the low image-quality images, and the image album creating apparatus has a low image-quality image receiving section for receiving the low image-quality images transmitted by the low image-quality image transmitting section, an image information receiving section for receiving the image information concerning the original image by correlating with each one of the low image-quality images received by the low image-quality image receiving section, an image selecting section for receiving the low image-quality images to be allocated to the image album from the low image-quality images received by the low image-quality image receiving section by analyzing the low image-quality image and the image information and a selected image notifying section for notifying the image album orderer of the low image-quality images selected by the image selecting section.

The image album orderer's apparatus may further include an original image transmitting section for transmitting the original images corresponding to the low image-quality images generated by the image quality converting section to the image album creating apparatus and the image album creating apparatus may further include an original image receiving section for receiving the original images corresponding to the low image-quality images notified by the selected image notifying section and transmitted from the original image transmitting section and an image album creating section for creating the image album by allocating the original images received by the original image receiving section to layout frames of the image album. The image album orderer's apparatus may have an image processing section for performing image processing on the original image corresponding to the low image-quality image notified from the selected image notifying section and a selected image transmitting section for transmitting a processed image of the original image on which image processing has been performed by the image processing section to the image album creating apparatus, and the image album creating apparatus may further include a selected image receiving section for receiving the processed image transmitted by the selected image transmitting section from the image album orderer's apparatus and an image album creating section for creating the image album by allocating the processed images received from the selected image receiving section. The image album orderer's apparatus may also have an image capturing apparatus having the image quality converting section, the image information adding section, the low image-quality image transmitting section, the image information transmitting section and an image capturing section for capturing an original image and an image capturing apparatus holding section that is electrically connected with the image capturing apparatus by holding the image capturing apparatus, for communicably connecting the image capturing apparatus with the image album creating apparatus, and the low image-quality image transmitting section may transmit the low image-quality image to the image album creating apparatus when the image album creating apparatus is communicably connected with the image capturing apparatus.

According to a third aspect of the invention, there is provided an image album creating method for creating an image album by using images provided from an image album orderer, having a low image-quality image receiving step of receiving low image-quality images of original images whose image quality has been lowered from an image album orderer's apparatus, an image information receiving step of receiving image information concerning the original image that can be specified from the original image or from when the original image was captured and that cannot be specified from the low image-quality image by correlating with each one of the low image-quality images received in the low image-quality image receiving step, an image selecting step of selecting the low image-quality image to be disposed in the image album out of the low image-quality images received in the low image-quality image receiving step by analyzing the low image-quality image and the image information and a selected image notifying step of notifying the image album orderer of the low image-quality image selected in the image selecting step.

According to a fourth aspect of the invention, there is provided an image album creating program for use in an image album creating system for creating an image album by using images provided from an image album orderer. The program operates the image album creating system as a low image-quality image receiving section for receiving low image-quality images of original images whose image quality has been lowered from an image album orderer's apparatus, an image information receiving section for receiving image information concerning the original image that can be specified from the original image or from when the original image was captured and that cannot be specified from the low image-quality image by correlating with each one of the low image-quality images received by the low image-quality image receiving section, an image selecting section for selecting the low image-quality image to be disposed in the image album out of the low image-quality images received by the low image-quality image receiving section by analyzing the low image-quality image and the image information and a selected image notifying section for notifying the image album orderer of the low image-quality image selected by the image selecting section.

It is noted that the summary of the invention described above does not necessarily describe all necessary features of the invention. The invention may also be a sub-combination of the features described above.

The invention allows communication traffics to be reduced by receiving original images of images to be used in creating the image album and by allocating the images to the image album after generating a sample of the image album by using low image-quality images.

BRIEF DESCRIPTION OF THE DRAWINGS

FIG. 4 is a table showing a data structure of an image processing method storing section 254.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
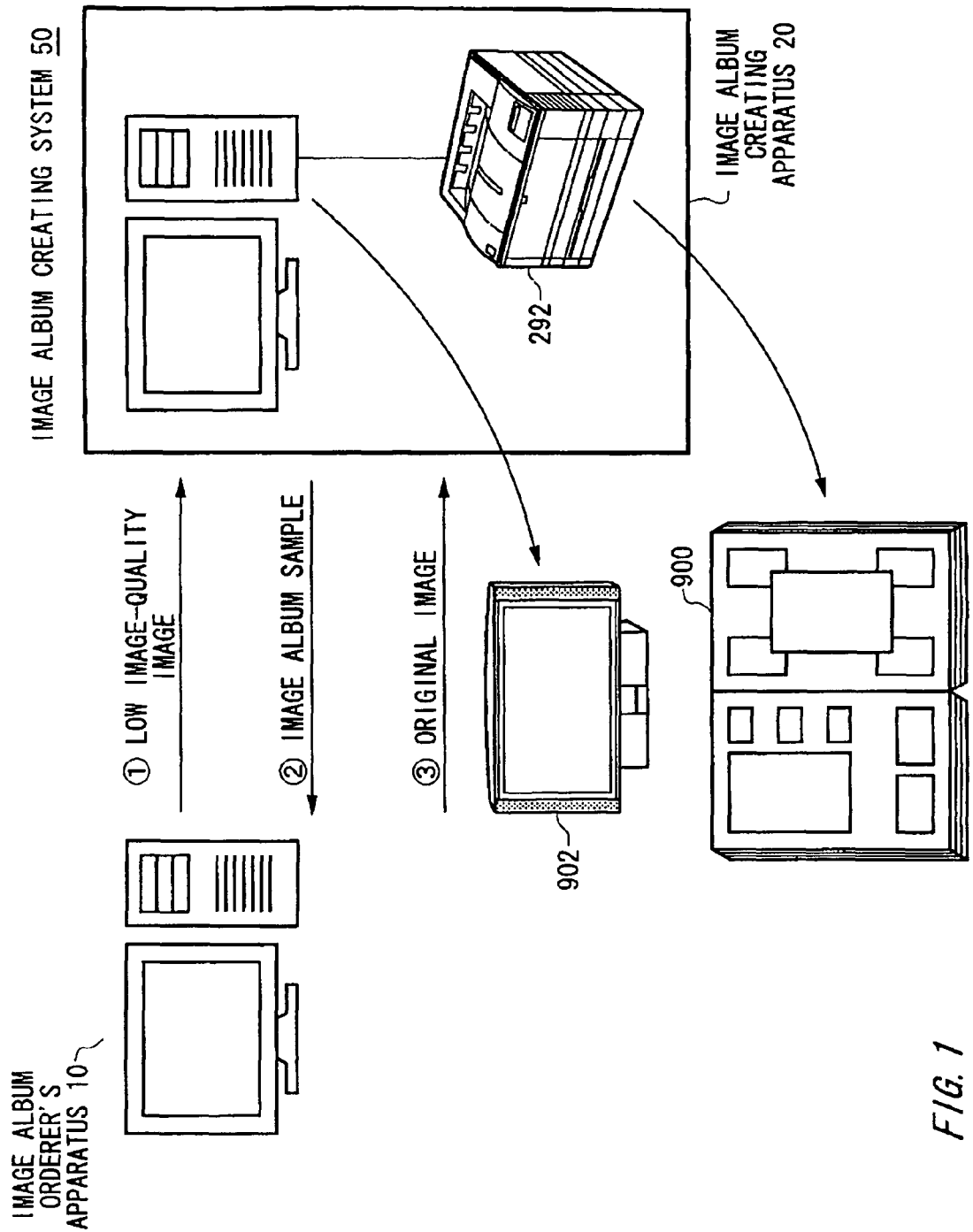
FIG. 1 is conceptual drawing of an image album creating system 50.

FIG. 1 is conceptual drawing of an image album creating system 50 according to one embodiment of the invention. The image album creating system 50 has an image album orderer's apparatus 10 and an image album creating apparatus 20. The image album creating apparatus 20 further includes an image album outputting section 292. The image album creating system 50 of the present embodiment generates a sample of an image album by receiving low image-quality images from the image album orderer's apparatus 10. It then aims at reducing communication traffics by receiving original images corresponding to the low image-quality images contained in the image album sample and selected in the image album orderer's apparatus 10 from the image album orderer's apparatus 10 and by allocating them to the image album. It is noted that the image album may be a post card to which a plurality of images is allocated, a calendar to which a plurality of images is allocated, a poster to which a plurality of images is allocated and an album having album pages containing at least one layout frame to which a plurality of images is allocated.

The image album orderer's apparatus 10 stores the original images captured and owned by a user. The image album orderer's apparatus 10 generates low-resolution images of the original images stored therein at first. It is noted that the low-resolution image is one example of the low image-quality image. The image album orderer's apparatus 10 supplies the low image-quality images corresponding to the images stored therein to the image album creating apparatus 20. In such a case, the image album orderer's apparatus 10 may supply the low image-quality images to the image album creating apparatus 20 via a storage medium such as a memory and a network such as Internet. The image album creating apparatus 20 generates the image album sample by selecting the low image-quality images suitable to be allocated to the image album out of the low image-quality images received from the image album orderer's apparatus 10 and by allocating the selected low image-quality images to layout frames of the image album. The image album creating apparatus 20 may create a plurality of image album samples. Then, the image album creating apparatus 20 supplies the created image album samples to the image album orderer's apparatus 10.

Still more, the layout frame to which images contained in the image album are allocated may be correlated with a type and image processing method of images to be allocated to the layout frame. Here, the type of the image may be an image quality of the image, a type of object contained in the image and an index specifying a number of objects contained in the image for example. Image processing specified by the image processing method may be trimming, binarization, monochromy and the like performed on the original image to be allocated to the layout frame. That is, it may be image processing for reducing a data amount of the original image to be allocated to the layout frame. The image album creating apparatus 20 selects low image-quality images to be allocated to the image album sample out of the low image-quality images received from the image album orderer's apparatus 10 based on the type of the image correlated with at least one layout frame contained in the image album to be generated by the image album creating apparatus 20. Then, the image album creating apparatus 20 may supply the generated image album sample, the low image-quality images allocated to the image album sample and the type and image processing method of the image correlated with at least one layout frame to the image album orderer's apparatus 10.

The image album orderer's apparatus 10 shows the plurality of image album samples received from the image album creating apparatus 20 to the user so that the user selects a desirable image album sample out of the plurality of image album samples. When the use selects the desirable image album sample, the image album orderer's apparatus 10 supplies only original images corresponding to the low image-quality images contained in the image album sample selected by the user to the image album creating apparatus 20. Then, the image album creating apparatus 20 generates an image album 900 by using the original images received from the image album orderer's apparatus 10. It is noted that the image album thus generated may be recorded in a storage medium such as DVD or may be supplied to the image album orderer's apparatus 10 via on-line as electronic data. Still more, the image album creating apparatus 20 may display the generated image album on a display unit such as a HDTV 902 as an electronic album.

The image album orderer's apparatus 10 may also supply the original image corresponding to the type of the image correlated with the layout frame contained in the image album sample selected by the user to the image album creating apparatus 20. For example, the layout frame may be correlated with information specifying that an image containing a principal person of the image album should be allocated as the image to be allocated to the layout frame. The image album orderer's apparatus 10 reads the information correlated with the layout frame and supplies the original image containing the principal person to be allocated to the layout frame to the image album creating apparatus 20. In other cases, the layout frame may be correlated with an index indicating a type of a person contained in the image such as the principal person of the image album, a family member of the principal person, a friend of the principal person and a pet of the principal person for example, image capturing information when the image was captured such as image capturing time and date, image capturing place and focusing distance for example and an image capturing mode when the image was captured such as a night view mode, a close-up mode and a landscape mode.

Still more, the image album orderer's apparatus 10 may supply a processed image on which image processing specified by the image processing method correlated with the layout frame contained in the image album sample selected by the user has been performed to the image album creating apparatus 20. For example, the layout frame may be correlated with image processing to be performed on the image to be allocated to the layout frame. The image album orderer's apparatus 10 reads information correlated with the layout frame and performs image processing on the original image to be allocated to the layout frame. It is noted that the image processing may be trimming, binarization, monochromy and cut of high-frequency components of the image. Then, the image album orderer's apparatus 10 supplies the processed image that is what the image processing has been performed on the original image to the image album creating apparatus 20. Then, the image album creating apparatus 20 generates the image album 900 by using the original images and the processed images received from the image album orderer's apparatus 10.

The image album creating system 50 of the present embodiment allows the image album sample to be generated by supplying the low image-quality images to the image album creating apparatus 20 and by causing the image album creating apparatus 20 to automatically select and allocate the low image-quality images suitable for generating the image album. It allows the works of the user to be considerably cut because the user is not required to select the original images to be used for creating the image album out of a large number of original images.

Still more, the image album creating system 50 of the present embodiment allows the image album to be created by supplying only original images corresponding to the low image-quality images used in the image album sample selected by the user to the image album creating apparatus 20. It allows communication traffics and communication costs to be reduced because original images not used in the creation of the image album are not supplied to the image album creating apparatus 20.

Furthermore, the image album creating system 50 of the present embodiment allows the image album to be created by supplying the processed images on which image processing, e.g., trimming, specified by the image processing method correlated with the layout frame contained in the image album sample selected by the user has been performed to the image album creating apparatus 20. It also allows the communication traffics and communication costs to be considerably reduced because the original images, except of those on which no image processing is performed, on which image processing of reducing image data has been performed may be supplied to the image album creating apparatus 20 when a plurality of layout frames is disposed in a page of the image album and when the high image-quality original images on which no image processing of reducing the image data such as trimming is performed are allocated only to part of layout frames out of the plurality of layout frames.

Figure 2:
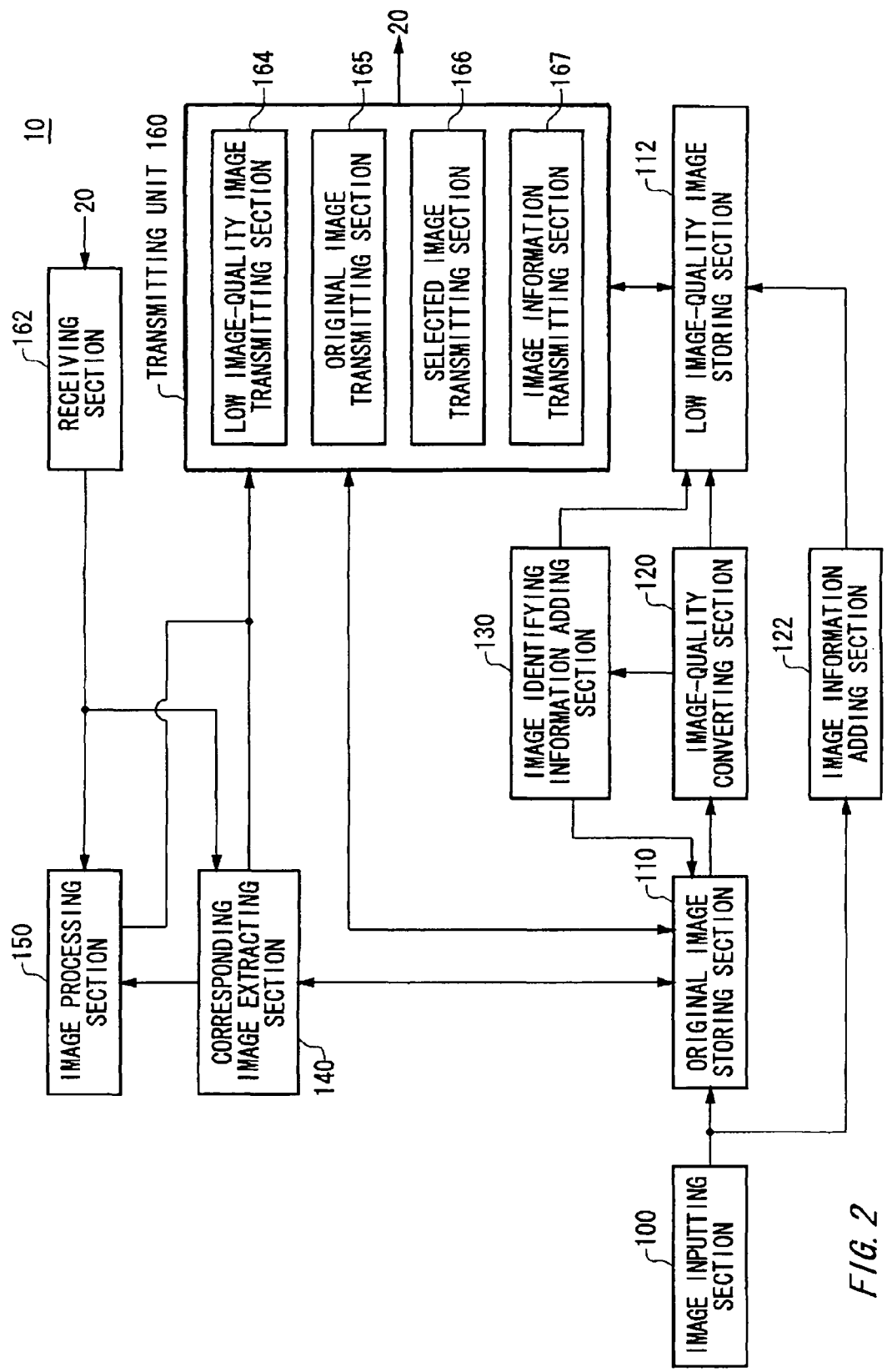
FIG. 2 is a block diagram showing a functional configuration of an image album orderer's apparatus 10.

FIG. 2 is a block diagram showing a functional configuration of the image album orderer's apparatus 10 of the present embodiment. The image album orderer's apparatus 10 orders the image album creating apparatus 20 to create an image album. The image album orderer's apparatus 10 has an image inputting section 100, an original image storing section 110, a low image-quality image storing section 112, an image-quality converting section 120, an image information adding section 122, an image identifying information adding section 130, a corresponding image extracting section 140, an image processing section 150, a transmission unit 160 and a receiving section 162. The transmission unit 160 also includes a low image-quality image transmitting section 164, an original image transmitting section 165, a selected image transmitting section 166 and an image information transmitting section 167.

The image inputting section 100 receives original images from the outside of the image album orderer's apparatus 10 via a memory, a network such as Internet, and the like. It is noted that the original image may be a high image-quality image. The image inputting section 100 may also receive original images from an image capturing apparatus or an image viewer that stores the original images via cable or radio communication. The image inputting section 100 also receives image information such as resolution of the original image, time and date when the original image was captured, place where the original image was captured, a light source when the image was captured, an image capturing mode, information on position of an object contained in the original image, a type of a person contained in the original image, expression of the person contained in the original image, pose taken by the person contained in the original image, position and size of a face of the person contained in the original image, information on position in the face such as eyes, nose and mouth, information on frequency components of the original image, information indicating adequacy of focusing in capturing the original image such as frequency level of the high-frequency components cut in the original image and focusing distance in capturing the original image, which are specifiable from the received original image or when the received original image was captured. The image inputting section 100 supplies the received images and image information to the original image storing section 110 and the image information adding section 122.

The original image storing section 110 stores the original image received from the image inputting section 100 by correlating with an identifier that allows the original image to be uniquely identified. The original image storing section 110 may store the received original image as it is without performing image processing for reducing image data of the received original image. The original image storing section 110 supplies the original image to the image-quality converting section 120 and the corresponding image extracting section 140 under control of the image-quality converting section 120 and the corresponding image extracting section 140. It is noted that the image album orderer's apparatus 10 may have an original image temporary storing section for temporarily storing the original image. The image inputting section 100 may supply the original image to the original image temporary storing section. The original image temporary storing section may then store the original image received from the image inputting section 100.

The image-quality converting section 120 lowers the image quality of the original image to generate a low image-quality image. More specifically, the image-quality converting section 120 generates the low image-quality image by lowering a data amount of the original image received from the original image storing section 110. It is noted that a low-resolution image is one example of the low image-quality image. The image-quality converting section 120 may convert a received image into a low image-quality image by performing irreversible compression. When the received original image is a still image, the image-quality converting section 120 may compress the original image by using such image compressing method as JPEG. When the received original image is a dynamic image, the image-quality converting section 120 may also compress the original image by using such image compressing method as MPEG. Still more, the image-quality converting section 120 may generate the low image-quality image by reducing the size or resolution of the original image or by cutting high-frequency components of the original image as means for compressing the original image. The image-quality converting section 120 may also increase a compression rate of an original image by cutting a number of frequency components to be stored or a number of bits representing level of the frequency components in storing the original image by performing frequency conversion per region set in advance for example. The image-quality converting section 120 supplies the low image-quality image thus generated to the low image-quality image storing section 112 and the image identifying information adding section 130.

The image information adding section 122 correlates image information concerning the original image that can be specified from the original image or when the original image was captured and that cannot be specified from the low image-quality image whose image quality has been lowered in the image-quality converting section 120 with each one of the low image-quality images. Specifically, the image information adding section 122 correlates the image information received from the image inputting section 100 with the identifier that uniquely identifies the original image correlated with the image information. Then, the image information adding section 122 stores the image information correlated with the original image to the low image-quality image storing section 112 by correlating with the original image corresponding to the low image-quality image stored in the low image-quality image storing section 112. It is noted that the image information may be correlated with the identifier for uniquely identifying the original image based on a result of analysis made the image information adding section 122 on the original image received from the image inputting section 100.

For example, the image information adding section 122 extracts original images containing persons out of a plurality of original images inputted to the image inputting section 100. Then, the image information adding section 122 extracts images in a region of the person contained in the original images out of the extracted original images. Next, the image information adding section 122 matches respective images in the extracted region of the person and may judge that a person who is contained most in the plurality of original images is the principal person. The image information adding section 122 stores image information indicating that the principal person is contained to the low image-quality image storing section 112 by correlating with image identifying information corresponding to the original images containing the principal person.

The image information adding section 122 may also categorize the plurality of original images received from the image inputting section 100 into a plurality of groups based on a criterion set in advance. Then, the image information adding section 122 may correlate each one of the plurality of original images categorized into the plurality of groups with group attribute information indicating attribute of each one of the plurality of groups. More specifically, the image information adding section 122 may categorize the original images into the plurality of groups per type of a person contained in the plurality of original images such as the principal person, a supporting person and a person who is deeply connected with the principal person or per time set in advance when the plurality of original images is successively captured. It is noted that the image information adding section 122 may judge whether or not the plurality of original images has been successively captured by reading image capturing time when the original images were captured. The image information adding section 122 stores the group identifying information to the low image-quality image storing section 112 as image information by correlating with the image identifying information corresponding to each of the plurality of original images.

The image identifying information adding section 130 adds image identifying information that correlates the low image-quality image received from the image-quality converting section 120 with the original image corresponding to the low image-quality image to the low image-quality image and the original image. The original image corresponding to the low image-quality image may be identified by making reference to such image identifying information. The image identifying information adding section 130 may also set a hard link with the original image, low image-quality image and image identifying information. The image identifying information adding section 130 supplies the image identifying information to the original image storing section 110 and the low image-quality image storing section 112. The low image-quality image storing section 112 stores the low image-quality image generated by the image-quality converting section 120 and the image identifying information received from the image identifying information adding section 130 and corresponding to the low image-quality image. It is noted that the original image storing section 110 also stores the image identifying information received from the image identifying information adding section 130. The low image-quality image storing section 112 supplies the low image-quality image and the image identifying information to the transmission unit 160.

The low image-quality image transmitting section 164 contained in the transmission unit 160 transmits the low image-quality image generated by the image-quality converting section 120 to the image album creating apparatus 20. More specifically, the low image-quality image transmitting section 164 acts on the low image-quality image storing section 112 to transmit the low image-quality image stored in the low image-quality image storing section 112 to the image album creating apparatus 20. It is noted that the low image-quality image supplied to the image album creating apparatus 20 may be at least a part of the low image-quality images stored in the low image-quality image storing section 112. The image information transmitting section 167 contained in the transmission unit 160 transmits the image information that has been correlated with each one of the low image-quality images by the image information adding section 122 to the image album creating apparatus 20 by correlating with each one of the low image-quality images. More specifically, the image information transmitting section 167 transmits the image information stored in the low image-quality image storing section 112 to the image album creating apparatus 20 by correlating with each one of the low image-quality images.

The receiving section 162 receives a plurality of image album samples as well as image identifying information and an image converting request corresponding to the low image-quality images contained in the image album samples from the image album creating apparatus 20. It is noted that the image conversion request may be a request that requests to carry out image processing such as trimming and conversion of magnification of the original image. The receiving section 162 may also receive the image processing method to be performed on the original image from the image album creating apparatus 20. The image processing method may be what is correlated in advance with the layout frame to which the images contained in the image album are to be allocated. The receiving section 162 supplies the image identifying information of the low image-quality images contained in the received image album sample to the corresponding image extracting section 140. The receiving section 162 also supplies the image conversion request and the image processing method to the image processing section 150.

Based on the image identifying information correlated with the low image-quality images contained in the image album sample received from the receiving section 162, the corresponding image extracting section 140 extracts the original images correlated with the low image-quality images out of the original image storing section 110. It is noted that when the image album orderer's apparatus 10 further includes the original image temporary storing section, the corresponding image extracting section 140 can extract the original images out of the original image temporary storing section even when the user has moved the original images corresponding to the low image-quality images to a different storage in the image album orderer's apparatus 10 after transmitting the low image-quality images generated from the original images to the image album creating apparatus 20. Still more, when the user has moved the original image corresponding to the low image-quality image to the different storage in the image album orderer's apparatus 10 after transmitting the low image-quality image generated from the original image to the image album creating apparatus 20 and when the corresponding image extracting section 140 is unable to extract the original image corresponding to the image identifying information out of the original image storing section 110, the corresponding image extracting section 140 may cause the user to specify the place where the original image correlated with the image identifying information is stored. The corresponding image extracting section 140 supplies the extracted original images to the original image transmitting section 165. The corresponding image extracting section 140 also supplies the extracted original images to the image processing section 150.

The image processing section 150 performs image processing on the original image received from the corresponding image extracting section 140 based on the image conversion request received from the receiving section 162. The image processing section 150 may also perform the image processing on the original image corresponding to the low image-quality image notified from the image album creating apparatus 20. Specifically, the image processing section 150 performs the image processing specified by the image processing method to be performed on the original image received from the receiving section 162 on the original image received from the corresponding image extracting section 140. More specifically, the image processing section 150 receives the original images corresponding to the low image-quality images allocated to the layout frame from the corresponding image extracting section 140 per each layout frame contained in the image album sample received by the receiving section 162. Then, the image processing section 150 extracts the image processing method correlated per layout frame in advance. In succession, the image processing section 150 performs the image processing specified by the extracted image processing method on the original images received from the corresponding image extracting section 140.

The image processing section 150 may perform such image processing of trimming a predetermined range of the original image, of converting resolution of the original image or of converting resolution of a region other than a region of a face of a person contained in the original image to be smaller than resolution of a region of the face of the person for example on the original image. Thereby, the image processing section 150 reduces a data amount of the original image. The image processing section 150 supplies the processed image that is what the image processing has been performed on the original image to the selected image transmitting section 166.

The selected image transmitting section 166 contained in the transmission unit 160 transmits the processed image received from the image processing section 150 to the image album creating apparatus 20. The original image transmitting section 165 contained in the transmission unit 160 also transmits the original image received from the corresponding image extracting section 140 to the image album creating apparatus 20. The low image-quality image transmitting section 164, the original image transmitting section 165, the selected image transmitting section 166 and the image information transmitting section 167 contained in the transmission unit 160 may supply predetermined information to the image album creating apparatus 20 via a memory, a network such as Internet, cable communication, radio communication and the like.

The image album orderer's apparatus 10 of the present embodiment allows the low image-quality images generated from the original images and the image information of the original images to be supplied to the image album creating apparatus 20. It then allows information for selecting images suitable for creating the image album to be supplied to the image album creating apparatus 20 without increasing the communication traffics. It also allows the increase of the communication traffics and communication costs to be suppressed because the image album orderer's apparatus 10 supplies the low image-quality images to the image album creating apparatus 20 at first.

Still more, the image album orderer's apparatus 10 of the present embodiment allows the image processing to be performed based on the image conversion request or image processing method received from the image album creating apparatus 20. It enables the user to prepare images to be used in the image album by performing adequate image processing on the original images to be allocated to the layout frame contained in the image album even if the user is unaccustomed to the image processing.

Furthermore, the image album orderer's apparatus 10 of the present embodiment enables the user to create the desirable image album just by supplying the original images corresponding to the low image-quality images contained in the image album sample received from the image album creating apparatus 20 and the processed images on which the image processing for reducing a data amount of the original images has been performed to the image album creating apparatus 20. It then allows the increase of the communication traffics to be suppressed and the communication costs to be reduced because no original image not used for creating the image album is supplied to the image album creating apparatus 20.

Figure 3:
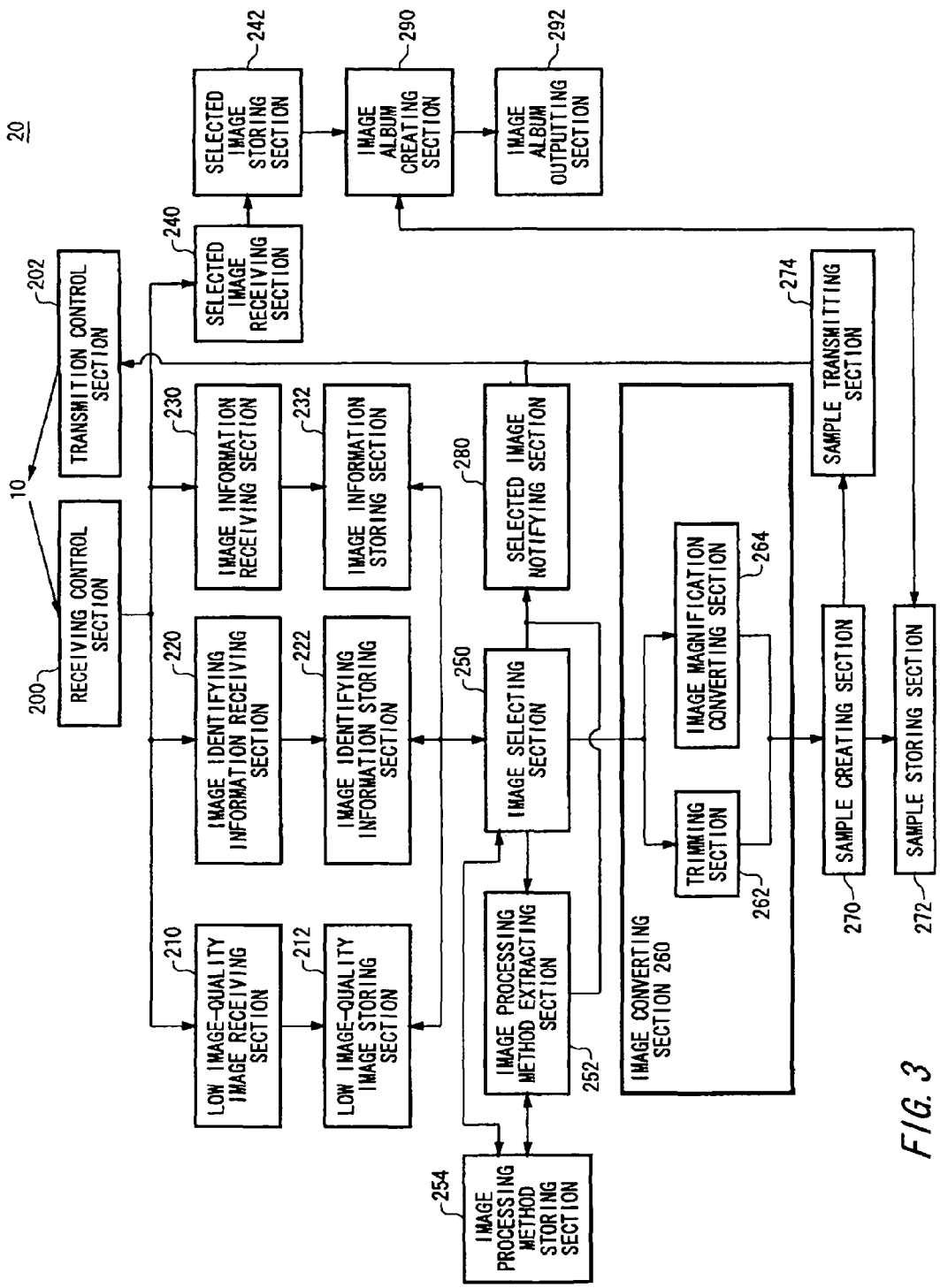
FIG. 3 is a block diagram showing a functional configuration of an image album creating apparatus 20.

FIG. 3 is a block diagram showing one exemplary functional configuration of the image album creating apparatus 20 of the embodiment. The image album creating apparatus 20 creates the image album by using images provided from the image album orderer's apparatus 10. The image album may contain at least one layout frame in which the images are to be allocated in the image album. The image album creating apparatus 20 has a receiving control section 200, a transmission control section 202, a low image-quality image receiving section 210, a low image-quality image storing section 212, an image identifying information receiving section 220, an image identifying information storing section 222, an image information receiving section 230, an image information storing section 232, a selected image receiving section 240, a selected image storing section 242, an image selecting section 250, an image processing method extracting section 252, an image processing method storing section 254, an image converting section 260, a sample creating section 270, a sample storing section 272, a sample transmitting section 274, a selected image notifying section 280, an image album creating section 290 and an image album outputting section 292. The image converting section 260 further includes a trimming section 262 and an image magnification converting section 264. It is noted that the image album creating section 290 and the image album outputting section 292 may be configured as an apparatus provided independently from the other members except of the image album creating section 290 and the image album outputting section 292.

The receiving control section 200 receives the low image-quality images, image identifying information, image information and original images from the image album orderer's apparatus 10. The receiving control section 200 supplies the low image-quality images to the low image-quality image receiving section 210, the image identifying information to the image identifying information receiving section 220, the image information to the image information receiving section 230 and the original images to the selected image receiving section 240. The low image-quality image receiving section 210 receives the low image-quality images of the original images whose image quality has been lowered by the image album orderer's apparatus 10 from the receiving control section 200 and supplies them to the low image-quality image storing section 212. The low image-quality image storing section 212 stores the low image-quality images received from the low image-quality image receiving section 210. The low image-quality image storing section 212 supplies the stored low image-quality images to the image selecting section 250 under the control of the image selecting section 250.

The image identifying information receiving section 220 receives the image identifying information added in the image identifying information adding section 130 by correlating with the original images and low image-quality images. More specifically, the image identifying information receiving section 220 receives the image identifying information correlated with each one of the low image-quality images received by the low image-quality image receiving section 210 respectively from the receiving control section 200. The image identifying information receiving section 220 supplies the image identifying information to the image identifying information storing section 222. The image identifying information storing section 222 stores the image identifying information received from the image identifying information receiving section 220. The image identifying information storing section 222 supplies the stored image identifying information to the image selecting section 250 under the control of the image selecting section 250.

The image information receiving section 230 receives the information concerning the original image, i.e., the image information, that can be specified from the original image or when the original image was captured and that cannot be specified from the low image-quality image from the receiving control section 200 by correlating with each one of the low image-quality images received by the low image-quality image receiving section 210. The image information receiving section 230 supplies the image information received from the receiving control section 200 to the image information storing section 232. tion received from the image information receiving section 230. The image information storing section 232 also supplies the image information to the image selecting section 250 under the control of the image selecting section 250.

The image selecting section 250 selects the low image-quality images to be allocated to the image album out of the low image-quality images received through the low image-quality image receiving section 210. The image selecting section 250 may also select the low image-quality images suitably allocated to the image album out of the low image-quality images received through the low image-quality image receiving section 210 by analyzing the low image-quality images and the image information received from the low image-quality image storing section 212 and the image information storing section 232. The image selecting section 250 may select the low image-quality images to be allocated to the image album based on resolution of original images contained in the image information. For example, when the image information includes information indicating that the resolution of the original image is high, the image selecting section 250 judges that the importance of the original image corresponding to that image information is high and selects the low image-quality image corresponding to that image information.

The image selecting section 250 may also select the low image-quality images to be allocated to the image album based on position of an object in the original image contained in the image information. For example, when information on the position of the object in the original image contained in the image information indicates that the object is positioned at the center or within a predetermined range from the center of the original image, the image selecting section 250 judges that the importance of the original image is high and selects the low image-quality image corresponding to that image information. When the position of the object is desirable to be distant from the center of the original image by a predetermined distance, the image selecting section 250 may select a low image-quality image corresponding to an original image in which the object is contained at the position distant from the center of the original image by the predetermined distance.

The image selecting section 250 may also select the low image-quality image to be allocated to the image album based on the image information concerning position and size of a face in the original image. For example, when the position of the face contained in the image information is contained at predetermined position in the original image and when the size of the face contained in the image information is within a predetermined size, the image selecting section 250 may select the low image-quality image corresponding to that image information. It enables the image selecting section 250 to select a low image-quality image corresponding to an original image in which a face of a person can be clearly discriminated, a low image-quality image corresponding to an original image in which position of a face of a person is located at position suitable in creating the image album and a low image-quality image corresponding to an original image containing a large number of persons such as a collective picture for example.

The image selecting section 250 may also select a low image-quality image to be allocated to the image album based on the image information of position of eyes, nose and mouth contained in a face in an original image. For example, the image selecting section 250 calculates a facial region by analyzing the image information and by detecting eye, nose and mouth parts contained in the low image-quality image by means of image matching. Then, the image selecting section 250 judges from the position of the eye, nose and mouth in the face whether the person having such face is adult or child. Thereby, the image selecting section 250 may select a low image-quality image corresponding to an original image containing children as a low image-quality image to be allocated to the image album based on the image information of position of eye, nose and mouth contained in the face when the image album to be created is an image album of an athletic meeting of an elementary school in which a large number of children appear for example.

The image selecting section 250 may also select a low image-quality image to be allocated to the image album by judging adequacy of focusing when its original image was captured based on frequency level of high-frequency components cut in the original image contained in the image information. Thereby, the image selecting section 250 can judge the adequacy of focusing when the original image was captured and can select a low image-quality image in focus while excluding a low image-quality image corresponding to an original image that is out of focus.

The image selecting section 250 may also select a low image-quality image to be allocated to the image album based on focusing distance in capturing an original image. For example, the image selecting section 250 may judge that the captured original image is what captured a distant view, e.g., a landscape, when information on focusing distance contained in the image information is greater than predetermined distance and that the captured image is what captured a close-range view when the information on focusing distance is shorter than the predetermined distance. Accordingly, the image selecting section 250 can select an adequate low image-quality image based on whether an original image required in the image album is what captured the distant view or what captured the close-range view.

The image selecting section 250 may also select a low image-quality image to be allocated to the image album based on person identifying information in an original image. Here, the person identifying information is one example of the image information received by the image information receiving section 230. Specifically, the person identifying information may be information for identifying a person in an original image. More specifically, it may be information indicating whether or not that the person in the original image is the principal person in the image album, information indicating that the person is a friend of the principal person, information indicating that the person is a family member, e.g., parents, grand parents, brothers and sisters, etc., and information indicating that an object is what is deeply connected with the principal person, e.g., a pet or structures such as a building. When the layout frame of the image album is correlated with information that an image of the principal person should be allocated to advance for example, the image selecting section 250 may select a low image-quality image containing the principal person and corresponding to the original image to be allocated to the layout frame out of the low image-quality image storing section 212.

The image selecting section 250 may also select a low image-quality image to be allocated to the image album based on personal character information indicating distinctive character of a person in an original image. It is noted that the personal character information is one example of image information received by the image information receiving section 230. Specifically, the personal character information may be information indicating an expression of the person in the original image, indicating whether or not eyes of the person is opened, indicating a pose taken by the person, indicating direction of body of the person with respect to the image, indicating direction of a face of the person with respect to the image and the like. When the layout frame of the image album is correlated in advance with information that an image of a person having a smiling expression should be allocated, the image selecting section 250 selects a low image-quality image corresponding to an original image that should be allocated to that layout frame. In the same manner, the image selecting section 250 may select a low image-quality image respectively from the low image-quality image storing section 212 by reading person identifying information correlated respectively with each one of a plurality of layout frames of the image album.

The image selecting section 250 may also select a low image-quality image to be allocated to the image album based on a group attribute information that indicates each attribute of a plurality of groups in which a plurality of original images is categorized based on a criterion set in advance. It is noted that the group attribute information is one example of the image information received by the image information receiving section 230. Specifically, when the group attribute information is information indicating a type of object contained in the an original image, the image selecting section 250 may select a low image-quality image out of the low image-quality image storing section 212 by reading the information on the type of the object correlated in advance with a layout frame of the image album. When the information on the type of the object correlated in advance with the layout frame indicates a friend of the principal person for example, the image selecting section 250 may select a low image-quality image correlated with the group identifying information that indicates the friend of the principal person.

The image album creating apparatus 20 may also include a template storing section for storing templates of the image album. The template may then include a page containing at least one layout frame. It is noted that the image album is an album, the page may be a spread page, a front page or a backbone page. When the image album is a post card, a poster, a calendar or the like, the page may be one page containing a plurality of layout frames. The layout frame may be correlated in advance with image information specifying an image to be allocated to the layout frame.

The layout frame may be also correlated with an identifier for identifying each layout frame. The image selecting section 250 may select each low image-quality image corresponding to the image information correlated with each one of the layout frames contained in the image album to be created out of the low image-quality image storing section 212. The image selecting section 250 supplies the selected low image-quality image to the image converting section 260 and the selected image notifying section 280 together with the image identifying information and image information. The image selecting section 250 also supplies information for identifying a layout frame in which the selected low image-quality image is to be allocated to the image processing method extracting section 252.

The image processing method storing section 254 stores the image processing method for reducing a data amount of an image to be allocated to a layout frame by correlating with the layout frame that is the position where the image is to be allocated to the image album. The image processing method storing section 254 may also store a type of an image when the image selecting section 250 selects the image to be allocated to each layout frame by correlating with each one of a plurality of layout frames contained in the image album. Then, the image selecting section 250 may select a low image-quality image out of the low image-quality image storing section 212 by making reference to the type of the image stored in the image processing method storing section 254 corresponding to the layout frame. It is noted that the image processing method stored by the image processing method storing section 254 corresponding to the layout frame may be the image processing method for reducing a data amount of the original image stored in the original image storing section 110 of the image album orderer's apparatus 10. The image processing method stored in the image processing method storing section 254 may be image processing such as trimming, binarization and monochromy of the original image for example.

The image processing method storing section 254 supplies the image processing method to the image processing method extracting section 252 under the control of the image processing method extracting section 252. The image processing method storing section 254 may also supply the type of the image correlated with the layout frame under the control of the image selecting section 250. The image processing method extracting section 252 extracts the image processing method stored in the image processing method storing section 254 corresponding to the layout frame in which the original image corresponding to the low image-quality image selected by the image selecting section 250 is allocated per low image-quality image. The image processing method extracting section 252 supplies the extracted image processing method to the selected image notifying section 280.

The selected image notifying section 280 notifies the image album orderer's apparatus 10 of the image processing method per low image-quality image obtained by the image processing method extracting section 252 together with the low image-quality image selected by the image selecting section 250. Specifically, the selected image notifying section 280 receives the low image-quality image selected by the image selecting section 250. The selected image notifying section 280 also receives the image processing method correlated with the low image-quality image per low image-quality image from the image processing method extracting section 252. The selected image notifying section 280 notifies the image album orderer's apparatus 10 of the image processing method to be performed on the selected low image-quality image and on the original image corresponding to the low image-quality image by transmitting the low image-quality image and the image processing method correlated with the low image-quality image to the image album orderer's apparatus 10 via the transmission control section 202.

The image converting section 260 of the image album creating apparatus 20 performs predetermined image processing on the low image-quality image received from the image selecting section 250 to reduce a data amount of the low image-quality image. Specifically, the trimming section 262 contained in the image converting section 260 trims the low image-quality image received from the image selecting section 250 to generate a low image-quality trimmed image whose data amount is reduced from the low image-quality image. The trimming section 262 generates the low image-quality trimmed image by trimming at least a part of a main object such as the principal person and persons and of the original image necessary for creating the image album. The trimming section 262 supplies trimming processing information, image identifying information and image information indicating trimmed low image-quality image and contents of the trimming process to the sample creating section 270.

The image magnification converting section 264 contained in the image converting section 260 generates a low image-quality magnification converted image by enlarging or reducing the size of the low image-quality image received from the image selecting section 250. The image magnification converting section 264 reduces the image data amount by enlarging or reducing the size of the low image-quality image. In case of enlarging the low image-quality image for example, the image magnification converting section 264 may generate the low image-quality magnification converted image by enlarging only at least a part of an original image used in creating the image album and by removing part of the low image-quality image except of the enlarged part. The image magnification converting section 264 supplies the generated low image-quality magnification converted image, image magnification conversion process information indicating contents of the image magnification converting process, the image identifying information and the image information to the sample creating section 270.

The sample creating section 270 creates the image album sample by allocating the low image-quality images selected by the image selecting section 250 to the layout frames of the image album. The sample creating section 270 may create a plurality of different image album samples by allocating the low image-quality images selected by the image selecting section 250 to the layout frames of the image album. The sample creating section 270 also receives the low image-quality trimmed image and the low image-quality magnification converted image from the image converting section 260. Then, the sample creating section 270 may create the image album sample by allocating the low image-quality trimmed images trimmed by the trimming section 262 to the layout frames of the image album. The sample creating section 270 may also create the image album sample by allocating the low image-quality magnification converted images enlarged or reduced by the image magnification converting section 264 to the layout frames of the image album.

It is noted that when the image album sample is an album, the image album sample created by the sample creating section 270 may be anyone of an image album sample having only a front page, an image album sample having only two spread pages of a predetermined page contained in the album, an image album sample of at least a part of pages contained in the album and an image album sample of whole pages contained in the album. The image album sample created by the sample creating section 270 may be also an image album sample of anyone of a post card, a poster, a photo album, a calendar and the like. Still more, the sample creating section 270 may create at least one image album sample by allocating a processed low image-quality image on which image processing specified by the image processing method extracted by the image processing method extracting section 252 per low image-quality image has been performed on the low image-quality image selected by the image selecting section 250. The sample creating section 270 supplies the created image album sample to the sample transmitting section 274 and the sample storing section 272. It is noted that the image identifying information, image information, trimming processing information and image magnification processing information may be added respectively to the low image-quality image, the low-image quality trimmed image and the low image-quality magnification converted image allocated to the image album sample.

The sample storing section 272 stores the image album sample received from the sample creating section 270 by correlating with an identifier that allows the image album sample to be uniquely identified. The sample storing section 272 also supplies the image album sample to the image album creating section 290. The sample transmitting section 274 transmits the image album sample received from the sample creating section 270 to the image album orderer's apparatus 10 via the transmission control section 202 to show to the user. When the sample transmitting section 274 receives a plurality of image album samples from the sample creating section 270, it also transmits the received plurality of image album samples to the image album orderer's apparatus 10 via the transmission control section 202 to show to the user. Then, the sample transmitting section 274 causes the user to select at least one image album sample out of the transmitted plurality of image album samples. The sample transmitting section 274 also supplies the image identifying information, trimming processing information and image magnification conversion process information added to the low image-quality image contained in the image album sample to the transmission control section 202.

The transmission control section 202 transmits the information received from the sample transmitting section 274 to the image album orderer's apparatus 10. The transmission control section 202 also transmits the image album sample received from the sample transmitting section 274, the low image-quality images received from the selected image notifying section 280 and the image processing method per low image-quality image to the image album orderer's apparatus 10. The transmission control section 202 may also transmit a trimming request of trimming a same region of the original image with the low image-quality trimmed image contained in the image album sample to the image album orderer's apparatus 10 together with the image album sample received from the sample transmitting section 274. The image album orderer's apparatus 10 may trim the same region of the original image with the low image-quality trimmed image contained in the image album sample based on the trimming request received from the transmission control section 202. It is noted that when the image album orderer's apparatus 10 receives the image processing method extracted out of the image processing method extracting section 252 from the transmission control section 202, it may precedently perform image processing specified by the image processing method on the original image.

That is, because image processing has been performed on the low image-quality image by the image converting section 260 of the image album creating apparatus 20, the same image processing effect may be always obtained when the same image processing with that image processing is performed on the original image corresponding to the low image-quality image. In trimming a person contained in the low image-quality image for example, there is a case when an outline of that person in the low image-quality image is not so clear as compared to an outline of the person contained in the original image corresponding to that low image-quality image. In such a case, the trimming result when the person contained in the low image-quality image is trimmed may differ from that when the person contained in the original image corresponding to the low image-quality image is trimmed. Accordingly, the image album orderer's apparatus 10 may perform the image processing specified by the image processing method extracted by the image processing method extracting section 252 on the original image precedently over the trimming request.

The transmission control section 202 may also transmit a resolution conversion request for converting resolution of an original image corresponding to an expansion rate or a reduction rate of a low image-quality magnification converted image contained in the image album sample to the image album orderer's apparatus 10 together with the image album sample received from the sample transmitting section 274. Still more, the transmission control section 202 may transmit a resolution conversion request for converting the resolution of the original image to be smaller to the image album orderer's apparatus 10 when the reduction rate of the low image-quality magnification converted image contained in the image album sample is greater than a reduction rate set in advance. That is, when the reduction rate of the low image-quality magnification converted image is greater than the reduction rate set in advance, the importance of the low image-quality magnification converted image for the image album is relatively small. Accordingly, it is possible to reduce communication traffics and communication costs in transmitting the original image from the image album orderer's apparatus 10 to the selected image receiving section 240 via the receiving control section 200 by transmitting the resolution conversion request that converts the resolution of the original image to be smaller from the selected image receiving section 240 to the image album orderer's apparatus 10.

Still more, the transmission control section 202 may transmit the resolution conversion request for converting the resolution of the original image corresponding to the type of the object contained in the low image-quality image in the image album sample to the image album orderer's apparatus 10 together with the image album sample received from the sample transmitting section 274. The image album orderer's apparatus 10 converts the resolution of the original image based on the received resolution conversion request. Then, the selected image receiving section 240 receives the original image whose resolution has been converted from the image album orderer's apparatus 10 via the receiving control section 200. Thereby, when the low image-quality image contains an object to be noticed in creating the image album, its resolution may be increased to a degree by which the object can be clearly understood. When the low image-quality image contains an object not so important in creating the image album, the resolution of the original image containing the object may be lowered.

The transmission control section 202 may also transmit the resolution converting request that converts resolution of a region of the original image corresponding to a region other than a face of a person contained in the low image-quality image in the image album sample to be smaller that in a region of the face of the person to the image album orderer's apparatus 10 together with the image album sample received from the sample transmitting section 274. Then, based on the resolution converting request received from the transmission control section 202, the image album orderer's apparatus 10 converts the resolution of the region of the original image corresponding to the region other than the region of the face of the person to be smaller than that in the region of the face of the person. Then, the selected image receiving section 240 receives the original image whose resolution has been converted from the image album orderer's apparatus 10 via the receiving control section 200.

It is noted that the resolution of the original image contained in the image album created in the image album creating apparatus 20 may be a value set in advance and the image album orderer's apparatus 10 may transmit an original image inputted to the image inputting section 100 to the image album creating apparatus 20 without changing its resolution. Still more, the image album orderer's apparatus 10 may transmit an original image whose resolution is smaller than that of an original image inputted to the image inputting section 100 and whose resolution is greater than that of a low image-quality image stored in the low image-quality image storing section 112.

The image album creating apparatus 20 may also transmit the resolution converting request to the image album orderer's apparatus 10 based on resolution of images required in the image album created in the image album creating apparatus 20. Then, the image album orderer's apparatus 10 may convert the resolution of the original image based on the resolution converting request after extracting the original image corresponding to the low image-quality image contained in the image album sample. That is, the image album orderer's apparatus 10 may convert the resolution of the original image and may transmit the original image whose resolution has been converted to the image album creating apparatus 20 so as to conform to the resolution required for images contained in the image album created in the image album creating apparatus 20. Further, when the image album orderer's apparatus 10 receives an image album sample from the image album creating apparatus 20, the image album orderer's apparatus 10 may create an image album by extracting and allocating original images corresponding to low image-quality images contained in the received image album sample. In such a case, the image album orderer's apparatus 10 may create the image album by allocating the original images, trimmed images and original images whose resolution has been converted to layout frames of the image album in the same manner with those described above.

The selected image receiving section 240 receives the original image corresponding to the low image-quality image selected by the image selecting section 250 and the processed image of the original image on which image processing specified by the image processing method per low image-quality image extracted by the image processing method extracting section 252 has been performed from the image album orderer's apparatus 10. It is noted that the original image receiving section described in Claim is one example of the selected image receiving section 240. Specifically, when the image album orderer's apparatus 10 selects at least one image album sample out of a plurality of image album samples, the selected image receiving section 240 receives original images corresponding to low image-quality images contained in the selected image album sample from the image album orderer's apparatus 10 via the receiving control section 200. The selected image receiving section 240 may also receive trimmed images obtained by trimming original images from the image album orderer's apparatus 10 via the receiving control section 200.

The image album orderer's apparatus 10 also converts resolution of an original image based on the resolution converting request received from the transmission control section 202. Then, the selected image receiving section 240 may receive the original image whose resolution has been converted from the image album orderer's apparatus 10 via the receiving control section 200. The selected image receiving section 240 may also receive a processed image of an original image, corresponding to a processed image contained in the image album sample, on which image processing specified by an image processing method extracted by the image processing method extracting section 252 has been performed from the image album orderer's apparatus 10.

The selected image receiving section 240 supplies the original image, the original image on which image processing such as trimming has been performed and the original image whose resolution has been converted, respectively received from the image album orderer's apparatus 10 via the receiving control section 200, to the selected image storing section 242. The selected image storing section 242 stores the original image, the original image on which image processing such as trimming has been performed and the original image whose resolution has been converted, respectively received from the selected image receiving section 240. The image album creating section 290 creates the image album by allocating the original image, the original image on which image processing such as trimming has been performed and the original image whose resolution has been converted, respectively received from the selected image storing section 242, to the layout frames of the image album.

Then, the image album creating section 290 supplies the created image album data to the image album outputting section 292. The image album outputting section 292 outputs the image album by using the received image album data. The image album outputted out of the image album outputting section 292 may be an image album printed on papers or an image album stored in a recording medium such as DVD. The image album outputting section 292 may also supply the image album to the image album orderer's apparatus 10 via a network such as Internet. Still more, the image album outputting section 292 may supply the image album to a terminal such as a personal computer of the user via a network such as Internet. The image album outputting section 292 may also display the image album on a HDTV 902 as an electronic album for example.

The image album creating apparatus 20 of the present embodiment can create the image album sample by automatically selecting low image-quality images suitable for creating the image album from low image-quality images received from the image album orderer's apparatus 10. Then, the image album creating apparatus 20 can create the image album by receiving high image-quality images which are original images of the low image-quality images contained in the crated image album sample from the image album orderer's apparatus 10. It allows communication traffics to be considerably reduced because the image album creating apparatus 20 can create the image album by receiving only the original images suitable for creating the image album as compared to the case of creating the image album by receiving all original images necessary for creating the image album from the image album orderer's apparatus 10.

Still more, the image album creating apparatus 20 of the present embodiment can create the image album sample by reducing an image data amount of the low image-quality images further by trimming only part of the low image-quality images received from the image album orderer's apparatus 10 and suitable for creating the image album. It allows the communication traffics between the image album creating apparatus 20 and the image album orderer's apparatus 10 to be reduced further and enables the user to view the image album sample lightly on the image album orderer's apparatus 10.

Still more, the image album creating apparatus 20 of the present embodiment can create the image album sample by automatically selecting the low image-quality images suitable for creating the image album and can transmit the image album sample to the image album orderer's apparatus 10 by adding information requesting to perform adequate image processing on the original images corresponding to the low image-quality images to the low image-quality images contained in the image album sample. It enables the user to cut works for selecting images used in creating the image album out of a large number of images and allows image processing to be performed on the original images without requiring complicated manipulation.

FIG. 4 is a table showing a data structure of the image processing method storing section 254. The image processing method storing section 254 stores image processing methods for reducing a data amount of an image to be allocated to a layout frame by correlating with the layout frame that is the position where the image is to be allocated to an image album. Specifically, the image processing method storing section 254 stores indices indicating a type of an image when the image selecting section 250 selects a low image-quality image and image processing methods to be performed on an original image corresponding to the low image-quality image by correlating with each one of the layout frames contained in the image album. It is noted that the indices indicating a type of an image is one example of image information.

It is also noted that the image processing methods for reducing a data amount of an image may be trimming, binarization, monochromy and the like of the original image for example. The image processing method storing section 254 may also store types of image to be allocated to a layout frame by correlating at least one layout frame contained in the image album. For example, the image processing method storing section 254 may store the types of image by categorizing per theme of the image album. The theme of the image album may be a school event such as an entrance ceremony, an athletic meeting and a graduation ceremony or may be a theme in one's life such as traveling, a wedding ceremony and a record of growth for example.

Specifically, the image album may have at least one layout frame in which the images are allocated. Then, the layout frame may be correlated in advance with at least one index specifying an image to be allocated to the layout frame. The image processing method storing section 254 stores the index by correlating with the layout frame. The index specifying an image to be allocated to the layout frame may be a type of an object contained in the image, e.g., whether or not the object is a person, whether or not the object is a pet and whether or not the object is a building, a type of a person contained in the image, e.g., whether or not the person is the principal person, whether or not the person is a friend of the principal person and whether or not the person is a family member of the principal person, a type of expression of the person in the image, a type of pose taken by the person in the image, and the like.

The index specifying an image to be allocated to the layout frame may be also resolution of an original image, image capturing conditions when the image was captured, e.g., image capturing time and date, image capturing place, a type of light source in capturing the image, whether or not strobe flash was used in capturing the image and focusing distance, an image capturing mode when the image was captured, e.g., a distant view mode, a close-range view mode, a night view mode, a close-up mode, a landscape mode, a party mode, a red-eye reducing mode and a portrait mode, and a structure of the image, e.g., position of an image fade-out point in the image, position of horizontal line in the image, distribution of spatial frequency components. For example, the layout frame may be correlated with an index specifying that an image fade-out point should be allocated at predetermined position of the layout frame.

It is noted that a designer who creates a layout of the image album may set such indices. That is, the designer may set the index specifying a type of image to be allocated to each one of the layout frames contained in the image album in advance in accordance to a theme of the image album. It is then possible to arrange so that image processors such as the image album orderer's apparatus 10, other than the image album creating apparatus 20, are disabled to make references to the indices and image processing methods stored in the image processing method storing section 254 and correlated with each one of the layout frames, except of the cases when the image selecting section 250 and the image processing method extracting section 252 of the image album creating apparatus 20 make references to them. It allows know-how of the designer used in creating the image album to be kept secret.

For example, the image processing method storing section 254 stores Pp, Smile, High image-quality and the like as indices of types of image by correlating with a layout frame 600. In such a case, the image selecting section 250 selects a low image-quality image corresponding to an original image that contains a smiling principal person and that is a high image-quality image as a low image-quality image to be allocated to the layout frame 600. It is noted that when the image selecting section 250 selects the low image-quality image, it selects by making references to image information correlated with the low image-quality image. The image processing method storing section 254 also stores Pet, Low image-quality and Number of pets as indices of types of image by correlating with a layout frame 602. In such a case, the image selecting section 250 selects a low image-quality image corresponding to an original image that contains a pet and that is a low image-quality image containing a predetermined number of pets as a low image-quality image to be allocated to the layout frame 602.

The image processing method storing section 254 also stores 'Trimming' as an image processing method by correlating with the layout frame 602. In such a case, the image processing method extracting section 252 extracts information specifying trimming as an image processing method by correlating with the layout frame 602. The image processing method extracted by the image processing method extracting section 252 is notified to the image album orderer's apparatus 10 by the selected image notifying section 280. The image album orderer's apparatus 10 extracts an original image corresponding to the low image-quality image to be allocated to the image capturing apparatus holding section 602 and performs the image processing method extracted by the image processing method extracting section 252, i.e., trimming, on the original image. Thereby, the trimmed original image containing the pets, that has been intended by the designer, is allocated to the layout frame 602.

Figure 5:
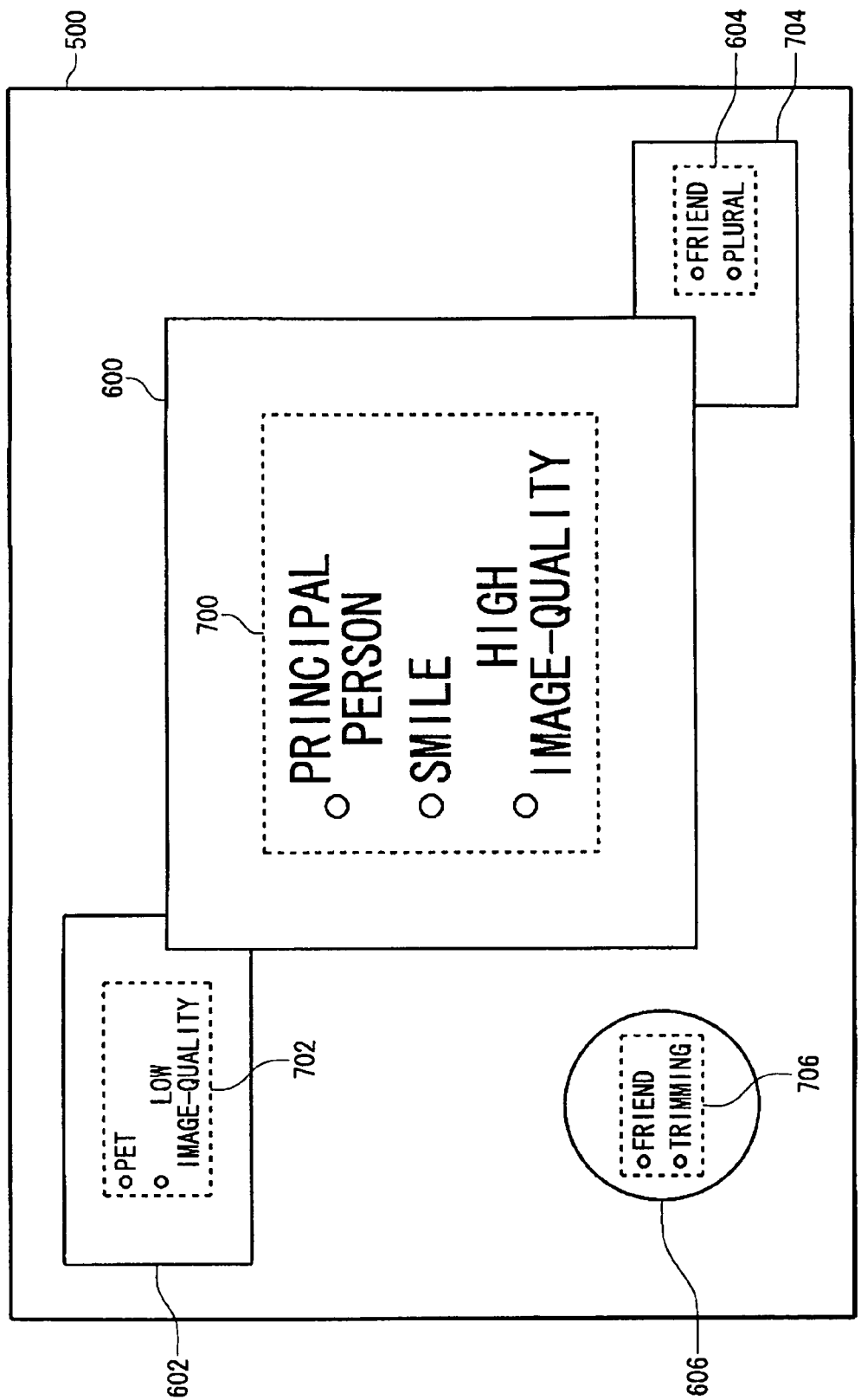
FIG. 5 is a drawing showing a image album creating system 500 of an image album.

FIG. 5 is a drawing showing a image album creating system 500 of the image album of the present embodiment. When the image album is a photo album for example, the image album creating system 500 may be a template 500 of a page of the album. When the image album is a post card, a poster, a calendar and the like, the image album creating system 500 may be a image album creating system 500 of the post card, the poster, the calendar and the like. At least one layout frame 600 in which an image should be allocated may be allocated to the image album creating system 500. Still more, the layout frame 600 may be correlated at least with one index, e.g., image information 700, specifying a type of image to be allocated to the layout frame 600.

Specifically, the image selecting section 250 obtains image information correlated in advance respectively with the layout frame 600, the layout frame 602, a layout frame 604 and a layout frame 606. For example, the image selecting section 250 obtains the image information 700 correlated in advance with the layout frame 600. Then, the image selecting section 250 selects the low image-quality image corresponding to the original image that contains the smiling principal person and that is a high image-quality image as the low image-quality image to be allocated to the layout frame 600. The image selecting section 250 also obtains image information 702 correlated in advance with the layout frame 602. Then, the image selecting section 250 selects a low image-quality image corresponding to the original image that contains the pet and that is a low image-quality image as the low image-quality image to be allocated to the layout frame 602. The image selecting section 250 obtains image information 704 and image information 706 correlated in advance respectively with the layout frames 604 and 606 and selects the low image-quality images to be allocated respectively in the layout frames 604 and 606.

Figure 6:
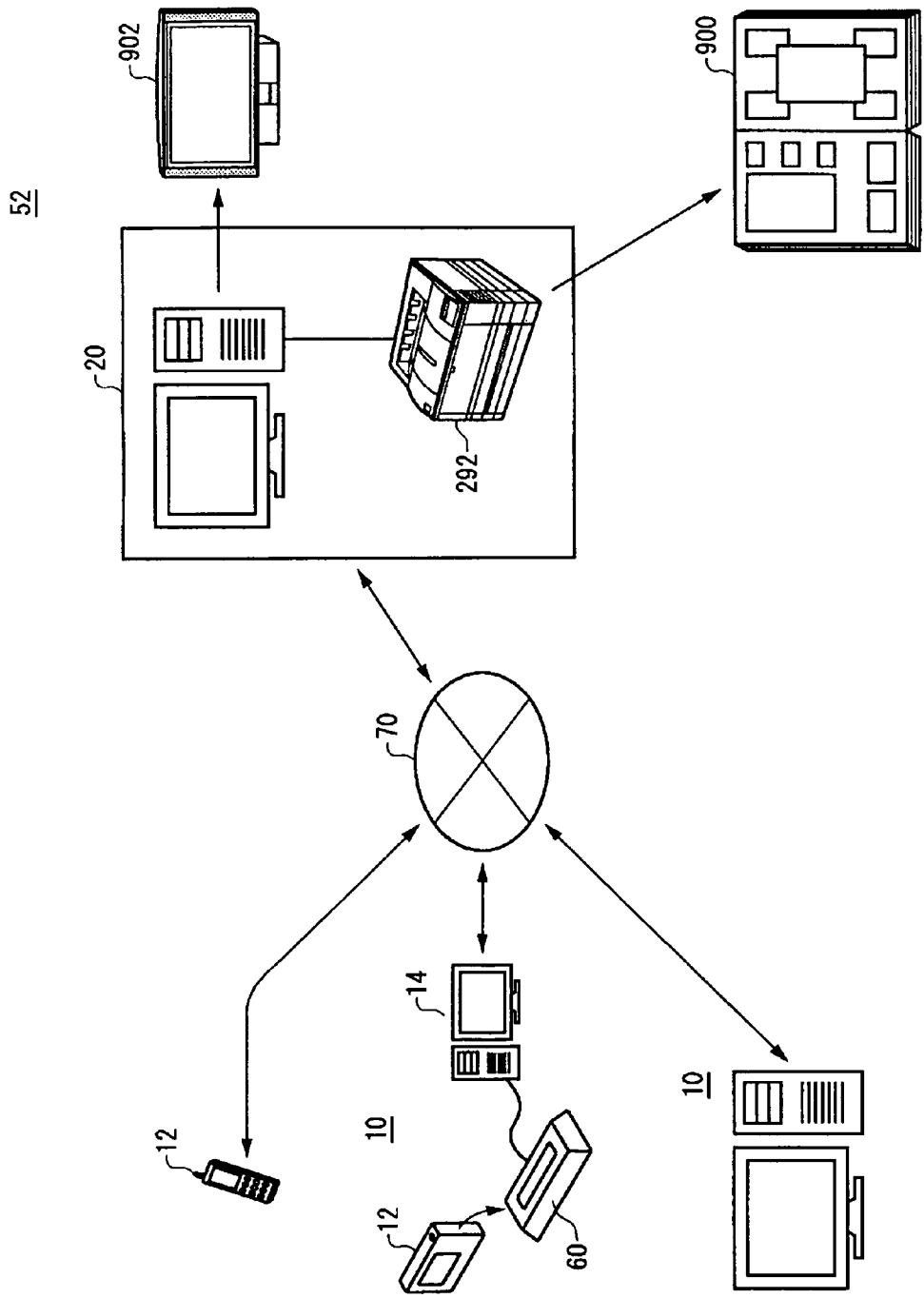
FIG. 6 is a conceptual drawing of an image album creating system 52.

FIG. 6 is a conceptual drawing showing an outline of an image album creating system 52 according to another embodiment of the invention. The image album creating system 52 has an image capturing apparatus 12, an image capturing apparatus holding section 60 and an image album creating apparatus 20. The image album creating system 52 may also have an image album orderer's apparatus 10. The image album orderer's apparatus 10 may also have the image capturing apparatus 12, the image capturing apparatus holding section 60 and a personal computer 14. It is noted that because the image album creating apparatus 20 has almost the same function and configuration with the image album creating apparatus 20 explained above in connection with FIGS. 1 through 5, so that its detailed explanation will be omitted here. It is noted that the image capturing apparatus 12 may have a part or whole of the function and configuration of the image album orderer's apparatus 10 explained above in connection with FIGS. 1 through 5.

In the image album creating system 52 of the present embodiment, the image album creating apparatus 20 creates image album samples by receiving low image-quality images of original images whose image quality has been lowered from a plurality of image capturing apparatuses 12 owned respectively by a plurality of image album orderers. Then, the image album creating system 52 aims at creating an image album by transmitting the created image album samples respectively from the image album creating apparatus 20 to the image capturing apparatuses 12 respectively owned by the plurality of image album orderers and by receiving original images corresponding to low image-quality images contained in the image album samples selected by the image album orderers from each one of the image capturing apparatuses 12 owned respectively by the plurality of image album orderers.

The image album creating apparatus 20 receives low image-quality images respectively from the image capturing apparatus 12 and the image album orderer's apparatus 10 owned by the image album orderers via a network 70 such as Internet. The image capturing apparatus 12 may be a portable phone having an image capturing function, a digital camera and the like for example. When the image capturing apparatus 12 is a digital camera having no communication function, it may be arranged so that original images stored in the image capturing apparatus 12 are transmitted to the personal computer 14 via the image capturing apparatus holding section 60 when the image capturing apparatus 12 is held in the image capturing apparatus holding section 60. It is noted that the image capturing apparatus holding section 60 may be a cradle for example. The personal computer 14 that has received the original images from the image capturing apparatus 12 generates low image-quality images from the received original images. Then, the personal computer 14 transmits the low image-quality images to the image album creating apparatus 20 via the network 70.

It is noted that the image capturing apparatus 12 or the image album orderer's apparatus 10 may cause low image-quality images corresponding to original images stored in another image capturing apparatus 12 or image album orderer's apparatus 10 to be transmitted to the image album creating apparatus 20 via the network 70. For example, the image album orderer's apparatus 10 designates a part or whole of original images stored in the image capturing apparatus 12 and to be used for creating the image album to the image capturing apparatus 12. Based on the designation made by the image album orderer's apparatus 10, the image capturing apparatus 12 generates low image-quality images of the part or whole of the designated original images. Then, the image capturing apparatus 12 may transmit the generated low image-quality images to the image album creating apparatus 20.

Then, the image album creating apparatus 20 makes an image album sample from the received low image-quality images. The image album creating apparatus 20 may make a plurality of image album samples. The image album creating apparatus 20 transmits the created image album samples to the image capturing apparatus 12 and the image album orderer's apparatus 10 via the network 70. The image capturing apparatus 12 and the image album orderer's apparatus 10 that have received the image album sample from the image album creating apparatus 20 show the image album sample to the image album orderers to let them select a desirable image album sample. It is noted that the image capturing apparatus 12 and the image album orderer's apparatus 10 may show the plurality of image album samples to the image album orderers to let them select an image album sample out of the plurality of image album samples. Next, the image capturing apparatus 12 and the image album orderer's apparatus 10 transmit original images corresponding to the low image-quality images contained in the image album sample selected by the image album orderer to the image album creating apparatus 20 via the network 70. Then, the image album creating apparatus 20 makes the image album by using the original images received from the image capturing apparatus 12 and the image album orderer's apparatus 10.

The image album creating apparatus 20 may also receive information for identifying the image album sample selected by the image album orderer from the image capturing apparatus 12 and the image album orderer's apparatus 10. Then, the image album creating apparatus 20 causes the image capturing apparatus 12 and the image album orderer's apparatus 10 having the original images corresponding to the low image-quality images contained in the image album sample specified by the information for identifying the received image album sample to transmit the original images to the image album creating apparatus 20. That is, the image album creating apparatus 20 obtains the original images corresponding to the low image-quality images contained in the image album sample respectively from the image capturing apparatus 12 and the image album orderer's apparatus 10 having the original images per image album sample selected by the image album orderer. Then, the image album creating apparatus 20 may generate the image album per image album orderer by using the original images received respectively from the image capturing apparatus 12 and the image album orderer's apparatus 10.

The image album creating apparatus 20 creates the image album 900 by using the original images received from the image capturing apparatus 12 and the image album orderer's apparatus 10. It is noted that the image album may be created by recording in a storage medium such as DVD or may be transmitted to the image capturing apparatus 12 and the image album orderer's apparatus 10 via the network 70 as electronic data. Still more, the image album creating apparatus 20 may display the created image album on a display unit such as a HDTV 902.

According to the image album creating system 52 of the present embodiment, the image album creating apparatus 20 receives the low image-quality images from the image capturing apparatus 12 and the image album orderer's apparatus 10 owned respectively by the plurality of image album orderers. Next, the image album creating apparatus 20 automatically creates image album samples by using the received low image-quality images and shows them to each one of the image album orderers. Then, the image album creating apparatus 20 creates the image album from the image album sample selected by the image album orderer. It allows one image album to be created from the original images owned by the plurality of image album orderers without concentrating the original images owned by each one of the plurality of image album orderers to the image capturing apparatus 12 or the image album orderer's apparatus 10 owned by anyone of the plurality of image album orderers.

Figure 7:
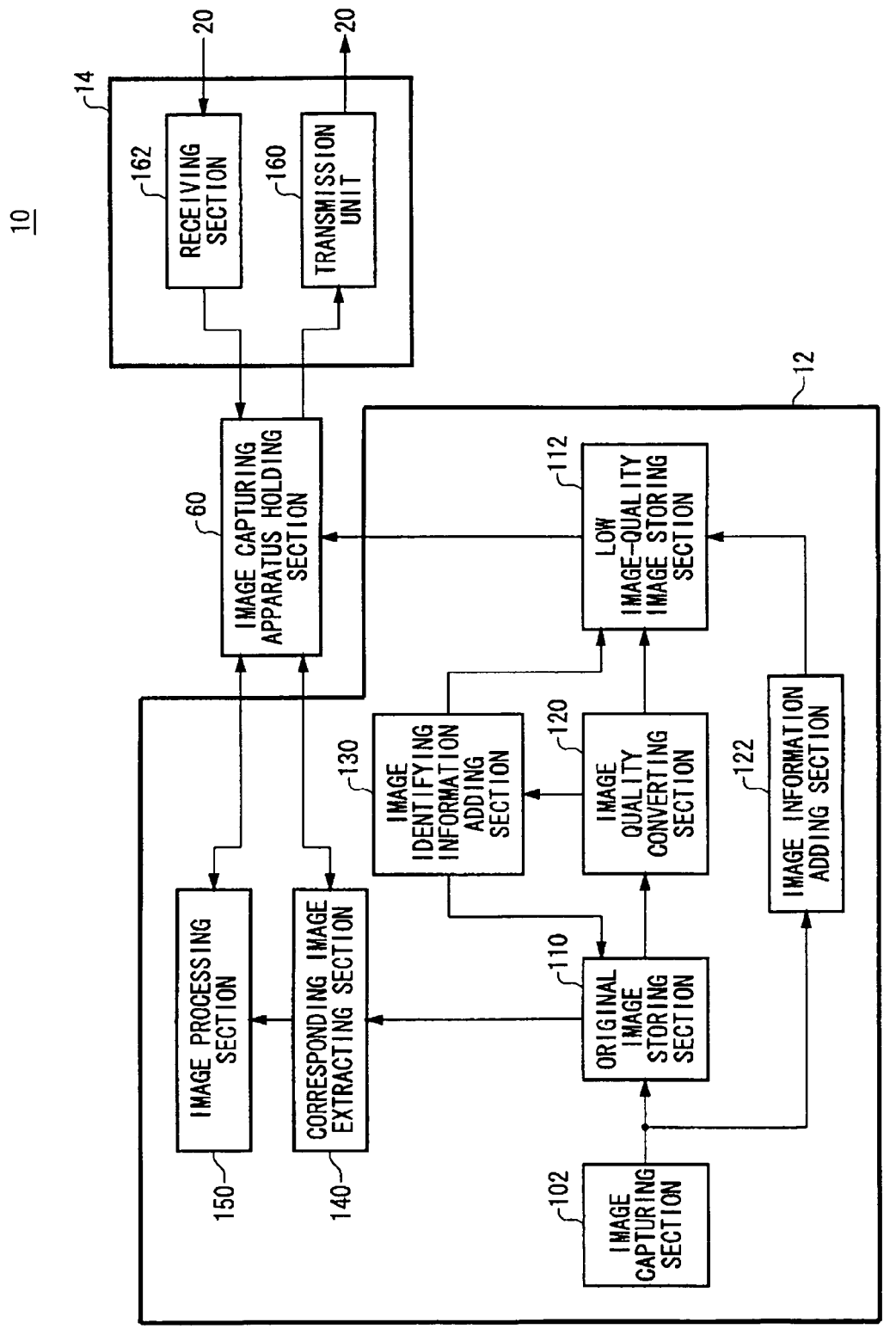
FIG. 7 is a block diagram showing a functional configuration of an image album orderer's apparatus 10.

FIG. 7 is a block diagram showing a functional configuration of the image album orderer's apparatus 10 according to the present embodiment. The image album orderer's apparatus 10 has the image capturing apparatus 12, the image capturing apparatus holding section 60 and the personal computer 14. The image capturing apparatus 12 has an image capturing section 102, an original image storing section 110, a low image-quality image storing section 112, an image-quality converting section 120, an image information adding section 122, an image identifying information adding section 130, a corresponding image extracting section 140 and an image processing section 150. The personal computer 14 includes a transmission unit 160 and a receiving section 162. The image capturing apparatus 12 may have a part or whole of the function and configuration of the personal computer 14. The image album orderer's apparatus 10 of the present embodiment may also a part or whole of the function and configuration of the image album orderer's apparatus 10 explained above in connection with FIGS. 1 through 5. It is noted that members contained in the image album orderer's apparatus 10 of the present embodiment have almost the same function with members denoted by the same reference numerals in the explanation above in connection with FIGS. 1 through 5, so that their detailed explanation will be omitted here.

The image capturing apparatus holding section 60 is electrically connected with the image capturing apparatus 12 when it holds the image capturing apparatus 12 and allows the image capturing apparatus 12 to communicate with the image album creating apparatus 20. The image capturing apparatus holding section 60 may be a cradle for example. The image capturing apparatus holding section 60 may be also connected with the personal computer 14. The image capturing section 102 captures original images. The image capturing section 102 may capture still or dynamic images. The image capturing section 102 supplies the captured original images to the original image storing section 110 and the image information adding section 122. The original image storing section 110 stores the original images by correlating with identifiers for identifying the original images. The original image storing section 110 supplies the original images to the image-quality converting section 120 under the control of the image-quality converting section 120. The original image storing section 110 also supplies the original images to the corresponding image extracting section 140 under the control of the corresponding image extracting section 140.

The image-quality converting section 120 converts image quality of the original images to generate low image-quality images of the original images whose data amount is reduced. The image-quality converting section 120 supplies the generated low image-quality images to the low image-quality image storing section 112 and the image identifying information adding section 130. The image identifying information adding section 130 adds image identifying information correlating the low image-quality images received from the image-quality converting section 120 with the original images corresponding to the low image-quality images to the low image-quality images and original images. The image identifying information adding section 130 stores the image identifying information added to the original images to the original image storing section 110. The image identifying information adding section 130 also stores the image identifying information added to the low image-quality images to the low image-quality image storing section 112. The image information adding section 122 correlates the image information with each one of the low image-quality images.

The image information adding section 122 stores the image information correlated with each one of the low image-quality images in the low image-quality image storing section 112. The low image-quality image storing section 112 transmits the low image-quality images and the image information correlated with the low image-quality images when the image capturing apparatus 12 is held in the image capturing apparatus holding section 60 to the image album creating apparatus 20 under the control of the transmission unit 160. The transmission unit 160 contained in the personal computer 14 may include a low image-quality image transmitting section 164, an original image transmitting section 165, a selected image transmitting section 166 and an image information transmitting section 167. When the image album creating apparatus 20 is communicably connected with the image capturing apparatus 12, the low image-quality image transmitting section 164 may automatically transmit the low image-quality images generated by the image-quality converting section 120 to the image album creating apparatus 20. It is noted that when the image capturing apparatus 12 has the function of the personal computer 14, the image capturing apparatus 12 may transmit the low image-quality images to the image album creating apparatus 20.

The image album creating apparatus 20 stores the low image-quality images received from the plurality of image capturing apparatuses 12 by correlating with identifiers for identifying each one of the plurality of image capturing apparatuses 12. Specifically, the image album creating apparatus 20 stores the low image-quality images in the low image-quality image storing section 212 common to all of the plurality of image capturing apparatuses 12. It is noted that the identifier for identifying each one of the image capturing apparatuses 12 may be an address correlated with each one of the plurality of image capturing apparatuses 12 or may be a telephone number when the image capturing apparatus 12 is a portable phone for example.

The image album creating apparatus 20 creates the image album sample by using the low image-quality images stored in the low image-quality image storing section 212. The image album creating apparatus 20 transmits the crated image album sample to the receiving section 162. The receiving section 162 supplies the received image album sample to the corresponding image extracting section 140 via the image capturing apparatus holding section 60. The receiving section 162 also supplies an image processing method correlated with the low image-quality image contained in the image album sample to the image processing section 150. The corresponding image extracting section 140 extracts original images corresponding to the low image-quality images contained in the image album sample. The corresponding image extracting section 140 supplies the extracted original images to the image processing section 150. Still more, the corresponding image extracting section 140 supplies the extracted original images to the transmission unit 160 when the low image-quality image corresponding to the extracted original image is correlated with no image processing method.

The image processing section 150 performs image processing specified by the image processing method received from the receiving section 162 on the original image received from the corresponding image extracting section 140. The image processing section 150 supplies processed images, on which the image processing has been performed, to the transmission unit 160. The original image transmitting section 165 contained in the transmission unit 160 transmits the original images received from the corresponding image extracting section 140 to the image album creating apparatus 20. The selected image transmitting section 166 contained also in the transmission unit 160 transmits the processed images received from the image processing section 150 to the image album creating apparatus 20. The image album creating apparatus 20 creates the image album by allocating the original images and processed images received from the image album orderer's apparatus 10 in the image album.

According to the image album creating system 52 of the present embodiment, the image capturing apparatus 12 transmits the low image-quality images and image information automatically to the image album creating apparatus 20 when the image capturing apparatus 12 is held in the image capturing apparatus holding section 60. Then, the image album creating apparatus 20 can automatically create the image album sample by using the low image-quality images and image information transmitted automatically from the image capturing apparatus 12. It enables the image album orderer to cut the works of transmitting the low image-quality images corresponding to the original images stored in the image capturing apparatus 12 by himself.

Figure 8:
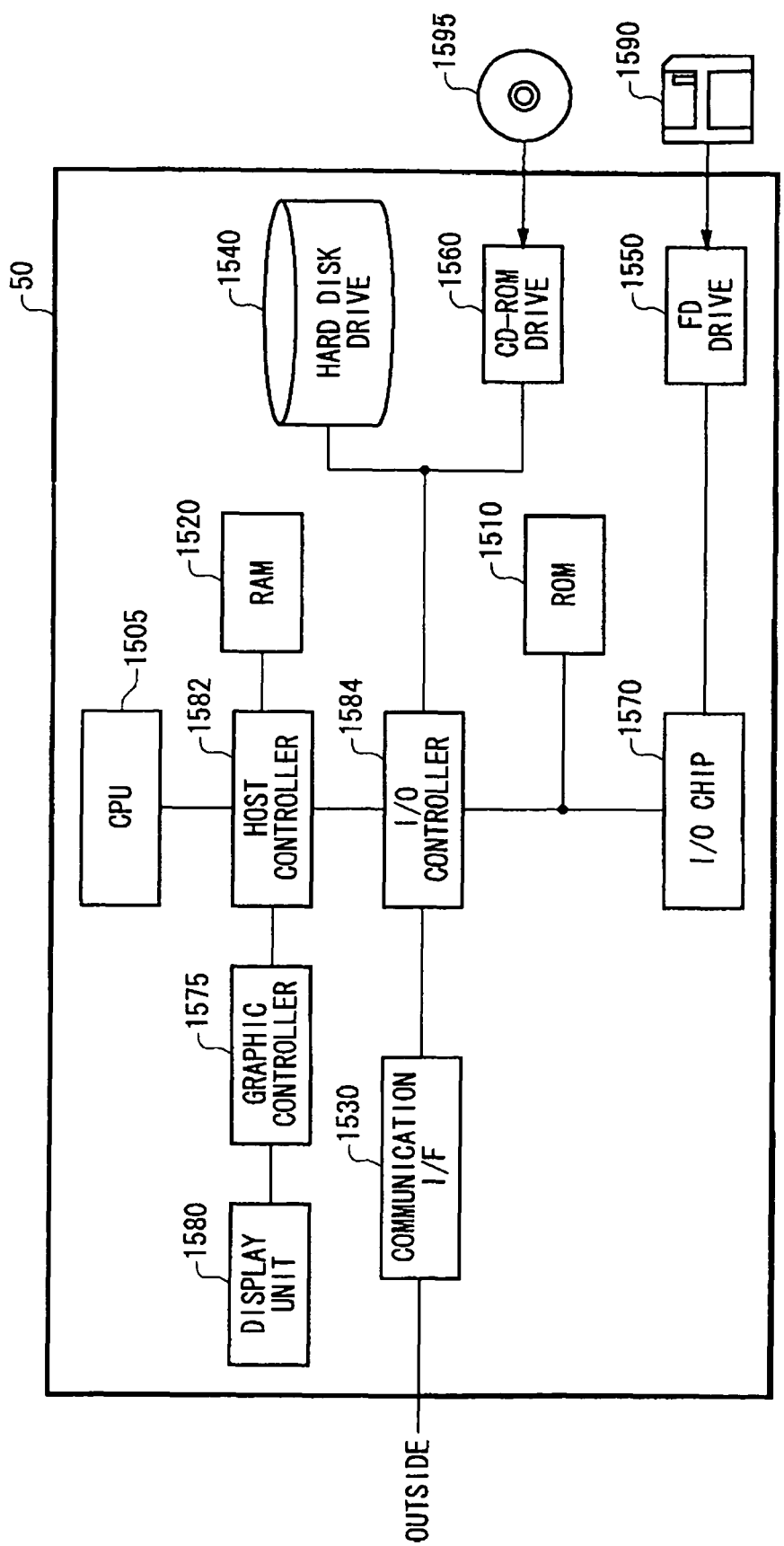
FIG. 8 is a block diagram showing a hardware configuration of the image album creating system 50.

FIG. 8 is a block diagram showing one exemplary hardware configuration of the image album creating system 50 and the image album creating system 52 of the present embodiment. The image album creating system 50 and the image album creating system 52 of the present embodiment has a CPU peripheral section having a CPU 1505, a RAM 1520, a graphic controller 1575 and a display device 1580 mutually connected by a host controller 1582, an input/output section having a communication interface 1530, a hard disk drive 1540 and a CD-ROM drive 1560 connected with the host controller 1582 via an input/output controller 1584 and a legacy input/output section having a ROM 1510, a flexible disk drive 1550 and an input/output chip 1570 connected with the input/output controller 1584.

The host controller 1582 connects the RAM 1520, the CPU 1505 that accesses the RAM 1520 at high transfer rate and the graphic controller 1575. The CPU 1505 operates based on programs stored in the ROM 1510 and the RAM 1520 to control the respective sections. The graphic controller 1575 obtains image data generated by the CPU 1505 and others on a flame buffer provided within the RAM 1520 to display on the display device 1580. Instead of that, the graphic controller 1575 may contain the frame buffer for storing the image data generated by the CPU 1505 and others.

The input/output controller 1584 connects the host controller 1582 with the communication interface 1530, which is a relatively fast input/output device, the hard disk drive 1540 and the CD-ROM drive 1560. The hard disk drive 1540 stores programs and data used by the CPU 1505 within the computer 1500. The communication interface 1530 communicates with the album generating apparatus 100 via network to provide programs or data to the album generating apparatus 100. The CD-ROM drive 1560 reads the program or data out of the CD-ROM 1595 and provides it to the hard disk drive 1540 and to the communication interface 1530 via the RAM 1520.

The input/output controller 1584 is connected with the relatively slow input/output devices of the ROM 1510, the flexible disk drive 1550 and the input/output chip 1570. The ROM 1510 stores a boot program executed by the image album creating systems 50 and 52 in starting the system and programs and the like dependent on the hardware of the image album creating systems 50 and 52. The flexible disk drive 1550 reads a program or data out of a flexible disk 1590 and provides it to the hard disk drive 1540 via the RAM 1520. The input/output chip 1570 connects the flexible disk drive 1550 with the various input/output devices via parallel ports, serial ports, keyboard ports, mouse ports and the like.

The image album creating program provided to the hard disk drive 1540 via the RAM 1520 is stored in a recording medium such as the flexible disk 1590, the CD-ROM 1595 or an IC card to be provided to the user. The image album creating program is read out of the recording medium to be installed in the hard disk drive 1540 within the image album creating systems 50 and 52 via the RAM 1520 and to be executed in the CPU 1505. The image album creating program installed in and executed by the image album creating systems 50 and 52 operates the CPU 1505 and others so as to cause the image album creating systems 50 and 52 explained in FIGS. 1 through 7 to function as the image capturing apparatus holding section 60, the image inputting section 100, the image capturing section 102, the original image storing section 110, the low image-quality image storing section 112, the image-quality converting section 120, the image information adding section 122, the image identifying information adding section 130, the corresponding image extracting section 140, the image processing section 150, the transmission unit 160, the low image-quality image transmitting section 164, the original image transmitting section 165, the selected image transmitting section 166, the image information transmitting section 167, the receiving section 162, the receiving control section 200, the transmission control section 202, the low image-quality image receiving section 210, the low image-quality image storing section 212, the image identifying information receiving section 220, the image identifying information storing section 222, the image information receiving section 230, the image information storing section 232, the selected image receiving section 240, the selected image storing section 242, the image selecting section 250, the image processing method extracting section 252, the image processing method storing section 254, the image converting section 260, the sample creating section 270, the sample storing section 272, the sample transmitting section 274, the selected image notifying section 280, the image album creating section 290, the image album outputting section 292, the trimming section 262 and the image magnification converting section 264.

Although the invention has been described by way of the exemplary embodiments, it should be understood that those skilled in the art might make many changes and substitutions without departing from the spirit and scope of the invention.

It is obvious from the definition of the appended claims that the embodiments with such modifications also belong to the scope of the invention.

What is claimed is:

1. An image album creating system, comprising:
   an image album orderer's apparatus for ordering to make an image album; and an image album creating apparatus for creating the image album by using images provided from said image album orderer's apparatus; wherein said image album orderer's apparatus has an image quality converting section for generating a low image-quality image by lowering image quality of an original image;

an image information adding section for correlating image information concerning said original image, that can be specified from said original image and the image information cannot be specified from said low image-quality image, said image information being added to each one of said low image-quality images;

a low image-quality image transmitting section for transmitting said low image-quality images generated by said image quality converting section to said image album creating apparatus; and an image information transmitting section for transmitting image information correlated by said image information adding section to each one of said low image-quality images to said image album creating apparatus by correlating with each one of said low image-quality images, wherein said low-quality images have a lower data amount than corresponding original images, and wherein said low-image quality transmitting section, said image information transmitting section, said image information adding section, and said image quality conversion section are implemented in at least a first processing device; and said image album creating apparatus has a low image-quality image receiving section for receiving said low image-quality images transmitted by said low image-quality image transmitting section;

an image information receiving section for receiving said image information concerning said original image by correlating with each one of said low image-quality images received by said low image-quality image receiving section;

an image selecting section for receiving said low image-quality images to be allocated to the image album from said low image-quality images received by said low image-quality image receiving section by analyzing said low image-quality image and said image information; and a selected image notifying section for notifying the image album orderer of said low image-quality images selected by said image selecting section, wherein said low-image quality receiving section, said image information receiving section, said image selecting section, and said image notifying section are implemented in at least a second processing device, further comprising: a plurality of layout frames, each of the layout, frames indicating a position in the image album where an image is to be located and having an identifying information to identify an image to be allocated, wherein said image selecting section selects low image-quality images having the identifying information as the image information and allocates the selected low image-quality images in the image album in accordance with the layout frames, and further comprising:

an image processing method storing section for storing image processing methods for reducing an amount of data of the images allocated to a layout frame where the images are to be allocated in said image album by correlating with the layout frame; and an image processing method extracting section for extracting the image processing method stored in said image processing method storing section per low image-quality image by correlating with the layout frame in which said original image corresponding to said low image-quality image selected by said image selecting section is allocated; wherein said selected image notifying section notifies the orderer of said image album of the image processing method per said low image-quality image obtained by said image processing method extracting section together with said low image-quality image selected by said image selecting section, a selected image receiving section for receiving processed image that is what image processing specified by the image processing method per said low image-quality image extracted by said image processing method extracting section has been performed on said original image from said image album orderer's apparatus, and an image album creating section for creating the image album by allocating said processed images received by said selected image receiving section.

2. The image album creating system as set forth in claim 1, further comprising:

a sample creating section for creating a sample of the image album by allocating said low image-quality images selected by said image selecting section; and a sample transmitting section for transmitting said image album sample created by said sample creating section to said image album orderer's apparatus to show to the orderer of the image album; wherein said selected image receiving section receives said original images corresponding to said low image-quality images contained in said image album sample from said image album orderer's apparatus.

3. The image album creating system as set forth in claim 2, wherein said sample creating section creates a plurality of different image album samples by allocating said low image-quality images selected by said image selecting section;

said sample transmitting section transmits said plurality of image album samples created by said sample creating section to said image album orderer's apparatus to show to the orderer of said image album so that the orderer selects at least one image album sample out of said plurality of image album samples; and said selected image receiving section receives said original images corresponding to said low image-quality images contained in said image album sample selected by the orderer of said image album from said image album orderer's apparatus.

4. The image album creating system as set forth in claim 1, further comprising:

a sample creating section for creating an image album sample by allocating processed images of said low image-quality images, selected by said image selecting section, on which image processing specified by an image processing method extracted by said image processing method extracting section per low image-quality image has been performed; and a sample transmitting section for transmitting said image album sample created by said sample creating section to said image album orderer's apparatus to show to the orderer of the image album; wherein said selected image receiving section receives said processed image of said original image, corresponding to said processed low image-quality image contained in said image album sample, on which image processing specified by the image processing method extracted by said image processing method extracting section per said low image-quality image has been performed from said image album orderer's apparatus.

5. The image album creating system as set forth in claim 1, wherein said sample creating section creates a plurality of different image album samples by allocating processed low image-quality images of said low image-quality images, selected by said image selecting section, on which image processing specified by the image processing method extracted by said image processing method extracting section per said low image-quality image has been performed;

said sample transmitting section transmits said plurality of image album samples created by said sample creating section to said image album orderer's apparatus to show to the orderer of the image album so that the orderer selects at least one sample out of said plurality of image album samples; and said selected image receiving section receives said processed images corresponding to said processed low image-quality images contained in said image album sample selected by the orderer of said image album from said image album orderer's apparatus.

6. The image album creating system as set forth in claim 1, wherein said low image-quality image receiving section receives low-resolution images of said original image whose resolution has been lowered.

7. The image album creating system as set forth in claim 6, wherein said image information receiving section receives resolution of said original image as image information concerning said original image; and said image selecting section selects said low image-quality image to be allocated to said image album based on the resolution of said original image.

8. The image album creating system as set forth in claim 1, wherein said image information receiving section receives position of an object in said original image as image information concerning said original image; and said image selecting section selects said low image-quality image to be allocated to said image album based on the position of the object in said original image.

9. The image album creating system as set forth in claim 8, wherein said image information receiving section receives position and size of a face in said original image as image information concerning said original image; and said image selecting section selects said low image-quality image to be allocated to said image album based on the position and size of the face in said original image.

10. The image album creating system as set forth in claim 1, wherein said low image-quality image receiving section receives a low image-quality image in which high-frequency components of said original image has been cut.

11. The image album creating system as set forth in claim 1, wherein said image information receiving section receives information indicating adequacy of focusing in capturing said original image; and said image selecting section selects said low image-quality image to be allocated to said image album based on the information indicating the adequacy of focusing in capturing said original image.

12. The image album creating system as set forth in claim 11, wherein said image information receiving section receives frequency level of high-frequency components cut in said original image as image information concerning said original image; and said image selecting section selects said low image-quality image to be allocated to the image album by judging adequacy of focusing when said original image was captured based on the frequency level of the high-frequency components cut in said original image.

13. The image album creating system as set forth in claim 11, wherein said image information receiving section receives focusing distance when said original image was captured as image information concerning said original image; and said image selecting section selects said low image-quality image to be allocated to the image album based on the focusing distance when said original image was captured.

14. The image album creating system as set forth in claim 1, wherein said image information receiving section receives person identifying information for identifying a person in said original image as image information concerning said original image; and said image selecting section selects said low image-quality image to be allocated to the image album based on the person identifying information in said original image.

15. The image album creating system as set forth in claim 1, wherein said image information receiving section receives personal characteristic information indicating distinctive character of a person in said original image as image information concerning said original image; and said image selecting section selects said low image-quality image to be allocated to the image album based on the personal characteristic information in said original image.

16. The image album creating system as set forth in claim 15, wherein said image information receiving section receives a facial expression of a person in said original image as image information concerning said original image; and said image selecting section selects said low image-quality image to be allocated to the image album based on the personal expression information in said original image.

17. The image album creating system as set forth in claim 1, wherein said image information receiving information receives group attribute information indicating attributes of each one of a plurality of groups into which said plurality of original images has been categorized based a criterion set in advance as image information concerning said original image; and said image selecting section selects said low image-quality image to be allocated to the image album based on the group attribute information in said original image.

18. The image album creating system as set forth in claim 17, wherein said image information receiving section receives group attribute information indicating a type of each object in the plurality of groups into which said plurality of original image has been categorized based on the type of objects as image information concerning said original image; and said image selecting section selects said low image-quality image to be allocated to the image album based on the group attribute information indicating the type of the object in said original image.

19. The image album creating system as set forth in claim 1, wherein said low image-quality image receiving section receives low image-quality images of original images whose image quality has been lowered from each one of a plurality of image album orderer's apparatuses;

said image information receiving section receives image information concerning said original image from each one of said plurality of image album orderer's apparatuses by correlating with each one of said low image-quality images received by said low image-quality image receiving section;

said image selecting section selects said low image-quality images to be allocated to the image album out of said plurality of low image-quality images received respectively by said low image-quality image receiving section by analyzing each one of said low image-quality images and said image information; and said selected image notifying section notifies the plurality of image album orderers of said low image-quality images selected by said image selecting section.

20. The image album creating system as set forth in claim 19, further comprising:

a sample creating section for creating an image album sample by allocating said low image-quality images selected by said image selecting section;

a sample transmitting section for transmitting said image album sample created by said sample creating section to a plurality of image album orderer's apparatuses to show to the plurality of image album orderers; and a selected image receiving section for receiving said original images corresponding to said low image-quality images contained in said image album sample respectively from each one of the plurality of image album orderer's apparatuses.

21. The image album creating system as set forth in claim 20, wherein said sample creating section creates a plurality of different image album samples by allocating said low image-quality images selected by said image selecting section;

said sample transmitting section transmits said plurality of image album samples created by said sample creating section respectively to a plurality of image album orderer's apparatuses to show to a plurality of image album orderers and to let them to select at least one out of said plurality of image album samples; and said selected image receiving section receives said original images corresponding to said low image-quality images contained in said image album sample selected at least by one of said plurality of image album orderers from each one of said plurality of image album orderer's apparatuses.

22. The image album creating system as set forth in claim 1, wherein said image album orderer's apparatus further includes an original image transmitting section for transmitting said original images corresponding to said low image-quality images generated by said image quality converting section to said image album creating apparatus; and said image album creating apparatus further includes an original image receiving section for receiving said original images corresponding to said low image-quality images notified by said selected image notifying section and transmitted from said original image transmitting section; and an image album creating section for creating the image album by allocating said original images received by said original image receiving section to layout frames of the image album.

23. The image album creating system as set forth in claim 1, wherein said image album orderer's apparatus has an image processing section for performing image processing on said original image corresponding to said low image-quality image notified from said selected image notifying section; and a selected image transmitting section for transmitting a processed image of said original image on which said image processing section has performed the image processing to said image album creating apparatus; and said image album creating apparatus further includes a selected image receiving section for receiving said processed image transmitted by said selected image transmitting section from said image album orderer's apparatus; and an image album creating section for creating the image album by allocating said processed images received from said selected image receiving section.

24. The image album creating system as set forth in claim 1, wherein said image album orderer's apparatus has an image capturing apparatus having said image quality converting section, said image information adding section, said low image-quality image transmitting section, said image information transmitting section and an image capturing section for capturing an original image; and an image capturing apparatus holding section, electrically connected with said image capturing apparatus by holding said image capturing apparatus, for communicably connecting said image capturing apparatus with said image album creating apparatus; and said low image-quality image transmitting section transmits said low image-quality image to said image album creating apparatus when said image album creating apparatus is communicably connected with said image capturing apparatus.

25. An image album creating system as set forth in claim 1, further comprising: a sample creating section for creating a plurality of different, image album samples by allocating the selected images of said low image-quality images; and a sample transmitting section for transmitting said plurality of image album samples created by said sample creating section to an image album orderer's apparatus to show to the orderer of the image album so that the orderer selects at least one sample out of said plurality of image album samples; and a selected image receiving section for receiving said original images corresponding to said selected low image-quality images contained in said image album sample selected by the orderer of said image album from said image album orderer's apparatus.

26. The system of claim 1, wherein the image album orderer's apparatus does not transmit original image data to the image album creating apparatus for purposes of creating the album.

27. An image album creating method for creating an image album by using images provided from an image album orderer, comprising:

converting original images provided by an image album ordered to low image-quality images;

adding image information for correlating image information concerning said original images, wherein said image information can be specified from the original image and cannot be specified from the low image-quality images, said image information being correlated with each on of the low image-quality images;

a low image-quality image receiving step of receiving from an image album orderer's apparatus, low image-quality images of original images whose image quality has been lowered by lowering data amount of the original images;

an image information receiving step of receiving image information concerning said original image that can be specified from said original image but wherein the image information cannot be specified from the low-quality image, said image information correlating with each one of said low image-quality images received in said low image-quality image receiving step;
an image selecting step of selecting said low image-quality image to be disposed in the image album out of said low image-quality images received in said low image-quality image receiving step by analyzing said low image-quality image and said image information; and
a selected image notifying step of notifying the image album orderer of said low image-quality image selected in said image selecting step,
wherein said low-image quality receiving step, said image information receiving step, said image selecting step, and said image notifying step are implemented in one or more processing devices, and
further comprising: a plurality of layout frames, each of the layout, frames indicating a position in the image album where an image is to be located and having an identifying information to identify an image to be allocated,
wherein said image selecting section selects low image-quality images having the identifying information as the image information and allocates the selected low image-quality images in the image album in accordance with the layout frames,
further comprising storing procedures for image processing methods for reducing an amount of data of the image allocated to a layout frame where the images are to be allocated in said image alum by correlating with the layout frame;
extracting the image processing procedure per low image quality image by correlating with the layout frame in which said original image corresponding to said low image-quality image selected by the image selecting step is allocated; wherein notifying the orderer of said image album includes notifying of the image processing per said low image-quality image obtained by the image processing extracting together with the low image-quality selected in the selecting step,
receiving a processed image according to what image processing is specified according to the extracted image processing, said processing being performed on original image data from an image album orderer's apparatus, and
creating the image album by allocating the processed images.

28. An image album creating method for creating an image album by using images provided from an image album orderer as set forth in claim 27, further comprising:
a sample creating section for creating a plurality of different, image album samples by allocating the selected images of said low image-quality images; and
a sample transmitting section for transmitting said plurality of image album samples created by said sample creating section to an image album orderer's apparatus to show to the orderer of the image album so that the orderer selects at least one sample out of said plurality of image album samples; and
a selected image receiving section for receiving said original images corresponding to said selected low image-quality images contained in said image album sample selected by the orderer of said image album from said image album orderer's apparatus.

29. A non-transitory computer-readable recording medium encoded with an image album creating program for use in an image album creating system for ordering an image album by using images provided from an image album orderer apparatus, and operating said image orderer apparatus as:

an image information adding section correlating image information concerning an original image that can be specified from the original image but cannot be specified from a low-quality image of the original image, said image information being transmitted to an image album creating apparatus, and said medium operating said image album creating system as:
a low image-quality image receiving section for receiving, from an image album orderer's apparatus, low image-quality images of original images whose image quality has been lowered by lowering data amount of the original images;
an image information receiving section for receiving image information concerning said original image that can be specified from said original image but the image information cannot be specified from the low image-quality image, said image information correlating with each one of said low image-quality images received by said low image-quality image receiving section;
an image selecting section for selecting said low image-quality image to be disposed in the image album out of said low image-quality images received by said low image-quality image receiving section by analyzing said low image-quality image and said image information; and
a selected image notifying section for notifying the image album orderer of said low image-quality image selected by said image selecting section,
wherein said low-image quality receiving section, said image information receiving section, said image selecting section, and said image notifying section are implemented in one or more processors, and
further comprising: a plurality of layout frames, each of the layout, frames indicating a position in the image album where an image is to be located and having an identifying information to identify an image to be allocated,
wherein said image selecting section selects low image-quality images having the identifying information as the image information and allocates the selected low image-quality images in the image album in accordance with the layout frames, and
further comprising:
an image processing method storing section for storing image processing methods for reducing an amount of data of the images allocated to a layout frame where the images are to be allocated in said image album by correlating with the layout frame; and
an image processing method extracting section for extracting the image processing method stored in said image processing method storing section per low image-quality image by correlating with the layout frame in which said original image corresponding to said low image-quality image selected by said image selecting section is allocated; wherein
said selected image notifying section notifies the orderer of said image album of the image processing method per said low image-quality image obtained by said image processing method extracting section together with said low image-quality image selected by said image selecting section,
a selected image receiving section for receiving processed image that is what image processing specified by the image processing method per said low image-quality image extracted by said image processing method extracting section has been performed on said original image from said image album orderer's apparatus, and an image album creating section for creating the image album by allocating said processed images received by said selected image receiving section.

30. A non-transitory computer-readable recording medium encoded with an image album creating program for use in an image album creating system for creating an image album by using images provided from an image album orderer as set forth in claim 29, further comprising: a sample creating section for creating a plurality of different, image album samples by allocating the selected images of said low image-quality images; and a sample transmitting section for transmitting said plurality of image album samples created by said sample creating section to an image album orderer's apparatus to show to the orderer of the image album so that the orderer selects at least one sample out of said plurality of image album samples; and a selected image receiving section for receiving said original images corresponding to said selected low image-quality images contained in said image album sample selected by the orderer of said image album from said image album orderer's apparatus.

* * * * *